United States Patent [19]
Yoshioka et al.

[11] Patent Number: 5,909,688
[45] Date of Patent: Jun. 1, 1999

[54] INFORMATION MANAGEMENT SYSTEM

[75] Inventors: Makoto Yoshioka; Hiroaki Negishi; Gengo Tazaki; John W. Mackin; Mitsuhiro Kokubun, all of Kawasaki, Japan

[73] Assignee: Fujitsu Limited, Kawasaki, Japan

[21] Appl. No.: 08/948,085

[22] Filed: Oct. 9, 1997

Related U.S. Application Data

[63] Continuation of application No. 08/303,739, Sep. 9, 1994, abandoned.

[30] Foreign Application Priority Data

Oct. 29, 1993 [JP] Japan .................................... 5-272122

[51] Int. Cl.⁶ .................................................... G06F 17/30
[52] U.S. Cl. .............................. 707/200; 707/1; 707/100; 707/101; 707/102; 707/533
[58] Field of Search .................................... 707/200, 533, 707/1, 100

[56] References Cited

U.S. PATENT DOCUMENTS

| | | | |
|---|---|---|---|
| 4,479,196 | 10/1984 | Ferrer et al. ............................. | 364/900 |
| 4,495,570 | 1/1985 | Kitajima et al. ........................ | 364/200 |
| 4,819,160 | 4/1989 | Tanka et al. ............................. | 364/300 |
| 4,868,733 | 9/1989 | Fujisawa et al. ........................ | 364/200 |
| 5,093,779 | 3/1992 | Sakurai .................................... | 395/600 |
| 5,179,643 | 1/1993 | Homma et al. .......................... | 395/140 |
| 5,257,185 | 10/1993 | Farley et al. ........................ | 364/419.19 |
| 5,263,160 | 11/1993 | Porter, Jr. et al. ...................... | 395/600 |
| 5,295,261 | 3/1994 | Simonetti ................................ | 395/600 |
| 5,345,587 | 9/1994 | Fehskens et al. ....................... | 395/650 |
| 5,414,834 | 5/1995 | Alexander et al. ..................... | 395/600 |
| 5,475,837 | 12/1995 | Ishak et al. ............................. | 707/200 |
| 5,475,838 | 12/1995 | Fehskens et al. .................... | 395/185.1 |
| 5,535,388 | 7/1996 | Takada ................................... | 395/650 |
| 5,611,076 | 3/1997 | Durflinger et al. ..................... | 395/613 |

*Primary Examiner*—Paul V. Kulik
*Assistant Examiner*—Jean M. Corrielus
*Attorney, Agent, or Firm*—Staas & Halsey

[57] ABSTRACT

In an information management system, individual entity information items related to one another are assigned unique identifiers. A smaller number of pointers are used to define high, low, front and rear-rank links among the entity information items. In an entity management table are placed records having a pointer to an entity information item and an identifier of the entity information item. In a structure management table are placed records representing types of the entity information items and having pointers to high, low, front and rear-rank records. There is further provided an identifier management table that relates the types of the entity information items to the identifiers. Use of these tables permits data retrieval in four directions of upward, downward, forward and rearward.

21 Claims, 37 Drawing Sheets

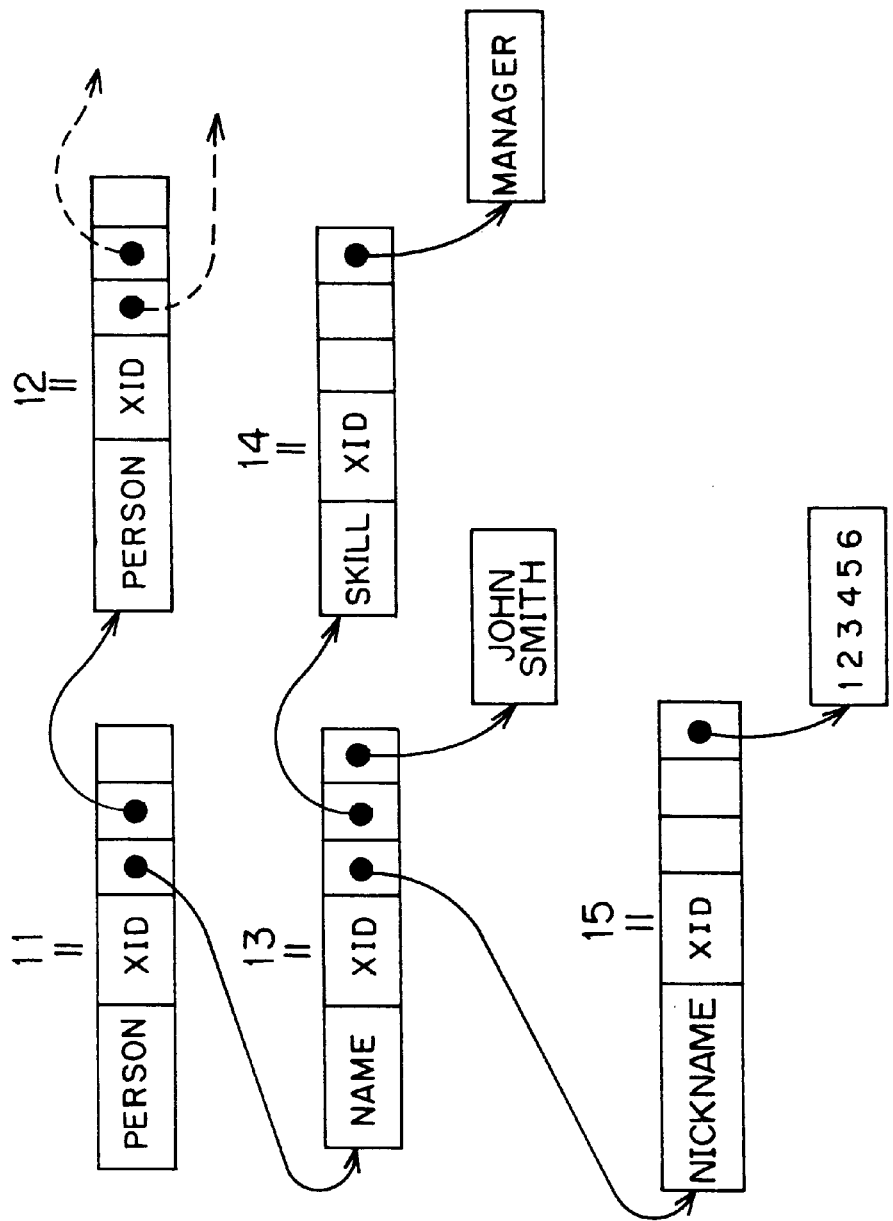
F I G. 9

INFORMATION MANAGEMENT SYSTEM

This application is a continuation of application Ser. No. 08/303,739, filed Sep. 9, 1994, now abandoned.

BACKGROUND OF THE INVENTION

1. Field of the Invention

The present invention relates to an information management system and a method therefor. More specifically, the present invention relates to an information management system for managing mutually related information items intended for use in process schedule control by way of example, each information item may be assigned a unique identifier.

2. Description of the Related Art

In recent years, the amount of data stored in database systems has increased dramatically, and the amount of information indicating relationships among the stored data items has also increased dramatically As an example, in process schedule control, an operational environment that involves man-machine interactions in four-dimensional events (including time) must be managed. As examples of relationships between object activities and men or machines for processing activities, there are a tree structure pattern, representing an organization, and a work flow, representing a sequence of processes. The activities are within constraints of time, cost, quality, company's rules, procedures, etc. It is desirable that the complex operational environment be defined and managed with as little information as possible in an efficient manner.

Information required for process schedule control includes information on the organization of a company as an organization for performing work and information on individual working processes. Of the information on the organization of the company, rank (upper and lower) relationships among workers are important. Of the information on working processes, time-sequential (before and after) relationships among the working processes are important.

In a conventional tree structure, however, links representing rank (up and down) relationships exist, but there is no link representing before and after relationships between information items of the same rank in the tree structure. That is, the structure of pointers indicating mutual relationships between information items is one dimensional, and no two-dimensional pointer is implemented.

A tree structure using bidirectional (upward and downward) pointers requires twice as many pointers as a tree structure using unidirectional (upward or downward) pointers. Therefore, many of conventional tree structures have downward pointers but not upward pointers. With tree structures only having such downward pointers, downward data retrieval from the tree's root to its leaves can be performed, but upward retrieval is impossible.

The reason why the pointers are generally of one dimension and in many cases there are only unidirectional pointers is to decrease the amount of data required to indicate relationships among items of information. Setting pointers of two dimensions of up, down, before and after, i.e., in four directions, to information required for the above-mentioned process schedule control becomes increasingly difficult as the amount of information required actually increases.

SUMMARY OF THE INVENTION

It is an object of the present invention to provide a data management system which permits substantially up-and-down (vertical) and front-and-rear (horizontal) relationships to be established among actually required information items, i.e., entity information items and the amount of data to be reduced.

The present invention assigns a unique identifier to an individual actual information item, i.e., an entity information item for information management. The information management system of the present invention comprises a structure management unit, an entity management unit, and an identifier management unit.

The structure management unit stores a structure management table constructed from records having labels representing types of individual information items. The number of the types of individual information items is generally smaller than the total number of the individual information items. Thus, it is reasonable to allow for the records in the structure management table to be far fewer in number than entity information items. In each record in the structure management table are placed (upward and downward) pointers to high- and low-ranking records that are structurally related to that record (vertically structured records) and (forward and rearward) pointers to records that are in the same rank in the vertical relationship and are to the left and right of or in the front and rear of that record (horizontally structured records). The upward pointers permit data retrieval toward the root which is highest in rank in a tree structure. The forward and rearward pointers permit retrieval of data items that are horizontally related. In general, the structure management unit stores more than one structure management tables. One or more structure management tables are also provided to define relationships among records in these structure management tables.

The entity management unit stores entity management tables which are each constructed from records to individual information items and which generally correspond in number to the structure management tables. In each record in the entity management tables are placed a label of a record in the structure management tables, an identifier for an entity information item, a pointer to a low-ranking record, a pointer to a right or rear-ranking record, and a pointer to that entity information item corresponding to that identifier. With each label representing the type of entity information are generally associated more than one entity information items. In the entity management tables there are more than one records having the same label.

The identifier management unit stores an identifier management table having identifier lists each corresponding to a respective one of the labels used in the structure management tables. In each identifier list is placed a set of an identifier and a pointer to a record corresponding to the identifier in the entity management tables. The identifier management table serves to couple the structure management tables and the corresponding entity management tables by using a correspondence between a label and identifiers.

In the present invention, the entity management unit manages records directly corresponding to entity information items, and the structure management unit defines connection relationships among types of the entity information items. By managing the entity information items and their connection relationships separately in this way, the number of pointers can be reduced. Since the structure management tables store upward pointers and forward pointers (or pointers to a left record), access to records that are in the high rank and in the same rank in the vertical relationship is permitted even if the corresponding entity management tables do not have those pointers.

The information management system of the present invention uses the structure management tables in the structure management unit and the entity management tables in the entity management unit to manage entity information items through the intermediation of the identifier management table in the identifier management unit, thereby permitting retrieval and updating of data items.

Moreover, the use of this information management system permits complex process schedule control to be performed exactly. In the process schedule control, the organizational hierarchical structure and the time-sequential structure of an operational environment can be represented by a single entity management table.

Furthermore, complex information can be defined by the consistent pointer structure, which permits the definition contents to be created and altered without depending on professional programmers.

BRIEF DESCRIPTION OF THE DRAWINGS

One skilled in the art can easily understand additional features and objects of this invention from the description of the preferred embodiments and some of the attached drawings. In the drawings:

FIG. 9 shows an example of an employee entity management table in the information management system of the present invention;

DETAILED DESCRIPTION OF THE PREFERRED EMBODIMENTS

Figure 1:
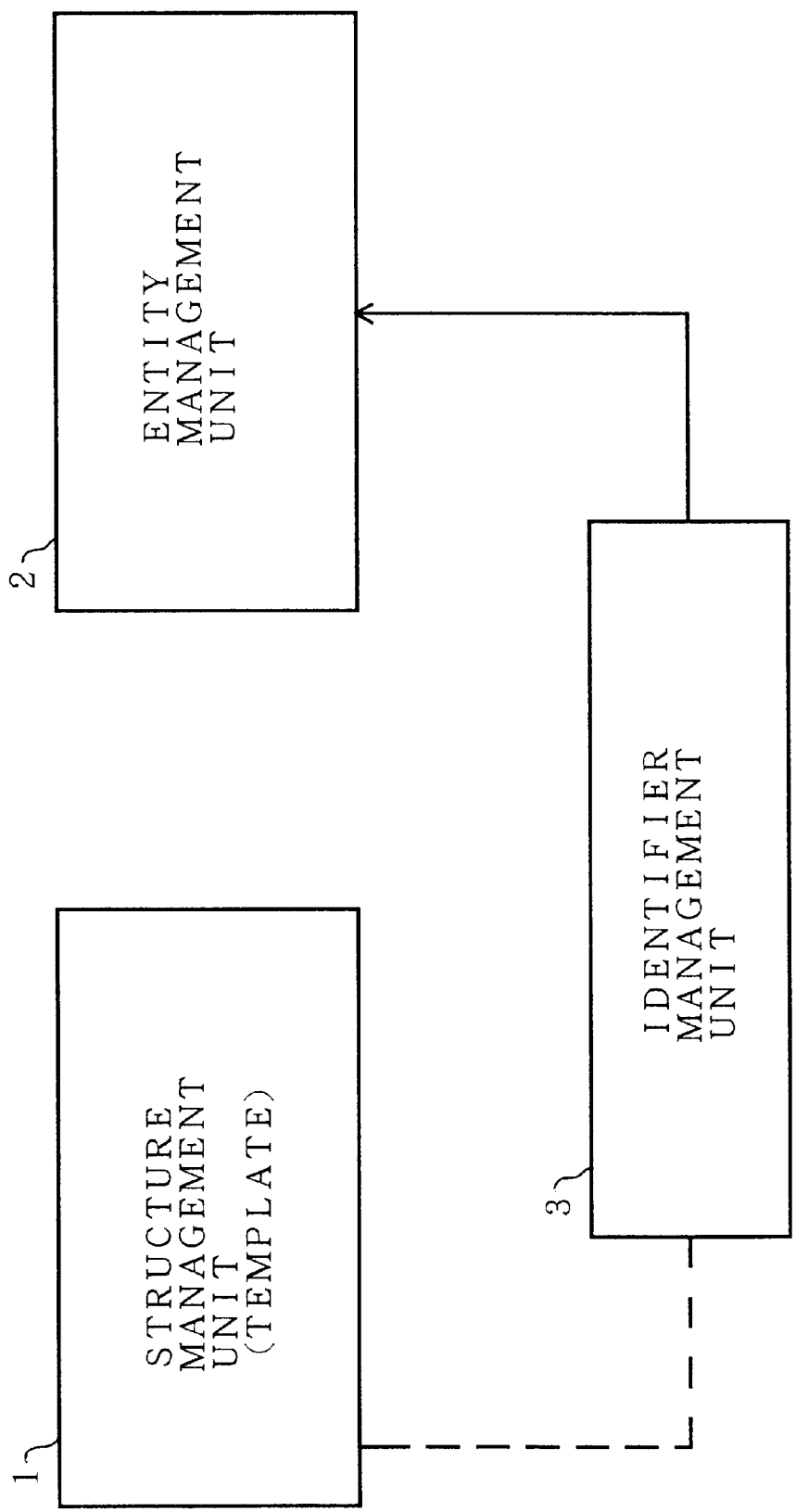
FIG. 1 illustrates major components of an information management system embodying the present invention.

Referring now to FIG. 1, there is illustrated major components of an information management system embodying the present invention. The information management system of FIG. 1 assigns a unique identifier (XID) to each of the actual information items, i.e., entity information items for information management In FIG. 1, a structure management unit 1 manages connection relationships among the types of individual information items, and an entity management unit 2 manages records corresponding to individual information items.

The structure management unit 1 stores one or more structure management tables (templates). In general, in the structure management unit 1 there are stored more than one structure management table as required. Each table comprises records corresponding to the respective types of the individual information items. For example, an organization template, which is one of several templates, comprises records corresponding to the types of information items, such as company, department, office, and section. Therefore, the number of records in a structure management table is much less than the total number of entity information items.

In each record there are stored pointers to high-ranking and/or low-ranking records that have structural relationships with that record and pointers to front-rank (preceding) and/or rear-rank (succeeding) records relative to that record which are in the same rank in terms of in the high-and-low-rank relationship. Storing pointers to higher-rank records allows data retrieval toward the root that is at the high rank of the tree structure. Also, storing of pointers to the front-rank and/or rear-rank records allows retrieval of data items which are in the same rank.

For example, between a department record and a section record there are stored upward and downward pointers. If there are more than one sections, there are stored pointers to front-rank and/or rear-rank records that are in the same rank in the high-and-low-rank relationship (vertical relationship). In general, in the company's organization, the horizontal relationship (front-rear relationship) between a department and an office or between sections is not so close as the vertical relationship (high-low relationship) between a department and a section. Thus, the horizontal and vertical relationships are definitely distinguishable from each other.

The entity management unit 2 stores entity management tables, for example. The entity management tables are equal in number to the structure management tables in general. A plurality of entity management tables are normally provided. The entity management tables, which correspond in structure to the structure management tables, have the structure of the same format as the structure management tables for example.

The records in the entity management tables store label names corresponding to the types of information of records in the structure management tables, identifiers (XIDs) of entity information items corresponding to the label names, pointers to low-rank and rear-rank records corresponding to the structure of the structure management tables, and pointers pointing to entity information items corresponding to the XIDs.

For example, in a record of department in an entity management table corresponding to the above-mentioned organization template there are stored entity information corresponding to that record, an XID value of, for example, a technical department, a pointer to a section record which is a low-rank record, a pointer to a record for another department which is in the same rank as that department, and a pointer to that department which is the entity information item This record itself is pointed to by a pointer to a low-rank record stored in a record of a company corresponding to an entity information item representing, for example, "FUJITSU".

An identifier management unit 3 stores pointers pointing to records for entity information items in the entity management tables correspondingly to XID values as unique identifiers assigned to individual entity information items.

XID lists in which the pointers and the corresponding XIDs are stored, which correspond to the respective templates stored in the structure management unit 1, are each provided for the respective label names of the records in the entity management tables. For example, for the above-mentioned organization template, an XID list is provided for each of a company, department, office, and section which are label names representing the types of information for the organization. In an XID list for the label name of department there are generally stored sets of XID values corresponding to entities of records having the label name of department and pointers pointing to these records in the entity management table representing the entity of the organization.

In the present embodiment, information management is carried out by using the templates in the structure management unit 1 and the entity management tables in the entity management unit 2 through the intermediation of a XID management table in the identifier management unit 3. In the templates indicating relationships among records indicating the types of information there are stored pointers to high, low, front and rear-rank records (upward, downward, forward and rearward pointers). In the entity management tables there are stored only pointers to low and rear-rank records as pointers indicating relationships among information items.

Since the templates have pointers to high-rank records and front-rank records, there is no need for storing these pointers in the entity management tables. Therefore, the amount of data (pointer information) to be stored in the entity management tables can be reduced. In addition, since the number of records in the templates are relatively small, the amount of data does not increase much even if the upward, downward, forward and rearward pointers are stored.

Figure 2:
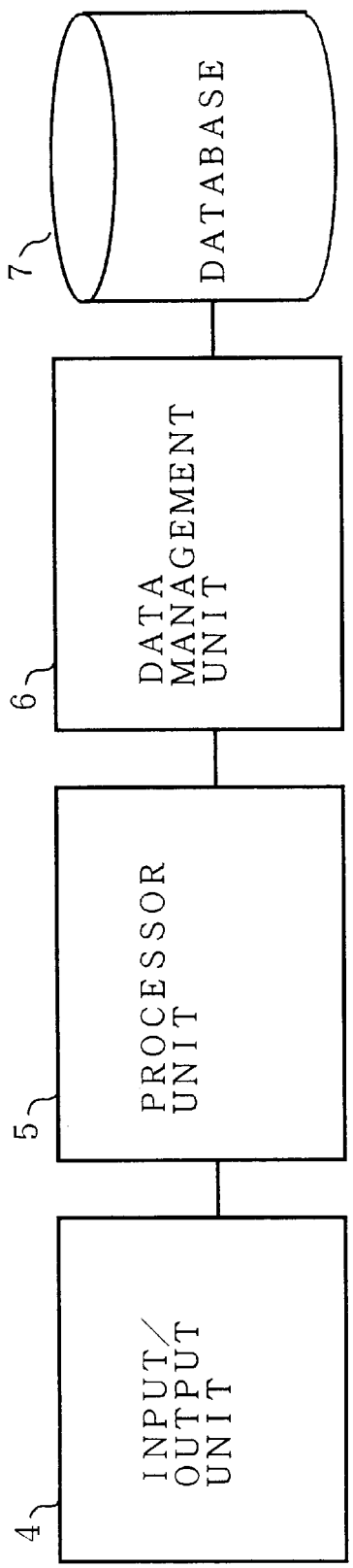
FIG. 2 illustrates the entire configuration of an information management system of the present invention.

FIG. 2 shows the whole configuration of the information management system of FIG. 1, which comprises an input/output unit 4, a processor unit 5, a data management unit 6, and a database 7. The structure management unit 1, the entity management unit 2, and the identifier management unit 3 of FIG. 1 are implemented as storage areas in the database 7.

The input/output unit 4 comprises a visual display unit or a printer, which is used to input and update information to be entered into the database 7 or to output information being managed. The processor unit 5 is used to enter input information into the database 7 or retrieve information from the database 7 via the data management unit 6. The data management unit 6 writes data into or reads data from the database 7.

Next, an information retrieval method for retrieving the name of the chief of a section in the case where there are available three types of templates: an organization template as described above, an employee template for managing employees names, their skills, and their nicknames, and a nexus template indicating relationships between information in the organization template and information in the employee template. It is supposed here that the XID as the identifier of that section is already known.

In the first place, the nexus template in which relationships between section information and name information are structurally indicated is searched for the type of information that is before or above section information in rank and moreover is before or above information to be searched for, i.e., the name, in rank. It is supposed here that this type of information is post.

Next, all the pointers to records (in an entity management table) corresponding to a label name of "post" are retrieved from a XID list corresponding to the above-described nexus template. These pointers are used in sequence to search through the records in the entity management table for a record that is above a record in which the above-described XID value for the section is stored. That record is the record of "post" in the entity management table corresponding to the nexus template. Assuming that the name record is stored in the rear of that record to correspond to the post, the XID value corresponding to the entity of that name is obtained by using the rearward pointer. However, it is supposed that pointers to entity information items are not stored in the entity management tables corresponding to the nexus template.

The remaining work is to search the entity management table corresponding to the employee table by using the XID for that name to thereby ascertain the name of an employee corresponding to that XID. To this end, an entry of name is retrieved from label names corresponding to the employee template within the XID management table, and a pointer matching that XID value is retrieved from the XID list pointed to by the entry. This pointer points to a record in the entity management table, which stores a pointer to an entity. This pointer to an entity is used to find entity information of name as the result of retrieval.

Next, the information management system of the present invention will be described using specific examples shown in figures.

Figure 3:
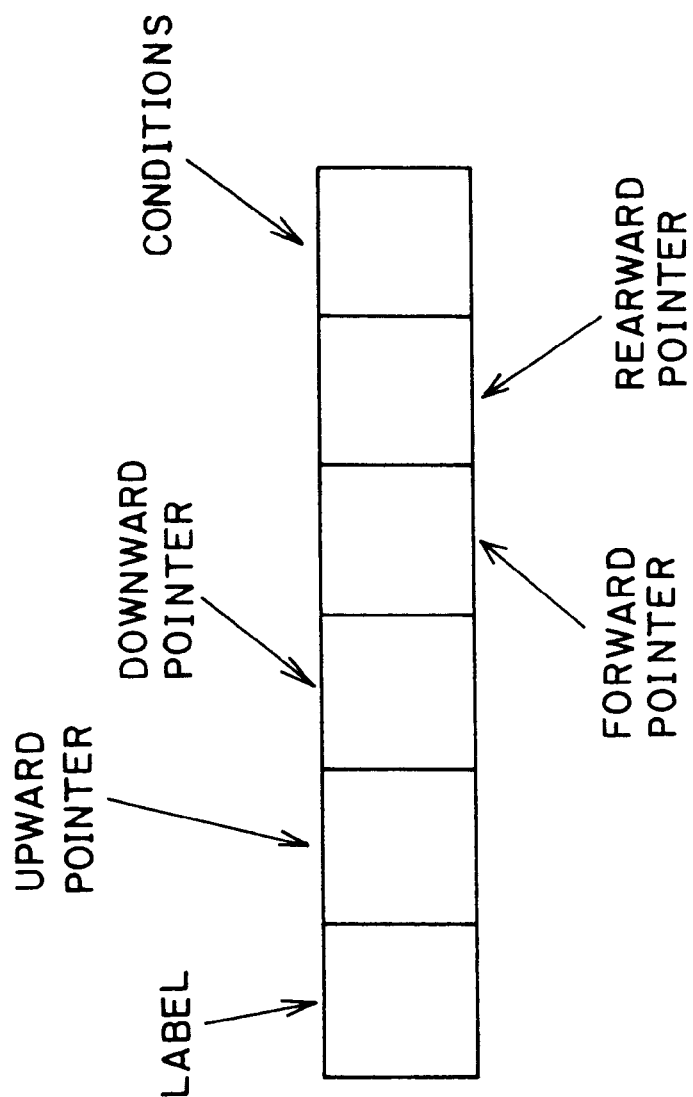
FIG. 3 illustrates an example of a format of a record in a template of the present invention.

FIG. 3 shows a format of a record stored in a structure management table, i.e., a template, which indicates relationships among types of individual data items as a structure linked by pointers, in a series of data items stored in the database 7.

The record is headed by a label indicating a type of information, followed by an upward pointer to a record in the high rank, a downward pointer to a record in the low rank, a forward pointer to a record in the front rank and a rearward pointer to a record in the rear rank (these two records are in the same rank in the vertical relationship) in a template indicating structural relationships among types of directly related information items, e.g., an organization template, and ended by conditions for the number of entity information items corresponding to the type of information. For example, the number of entity information items are one or more in the case of section and one in the case of employee's name. These conditions are used in adding new records to the entity management table.

Figure 4B:
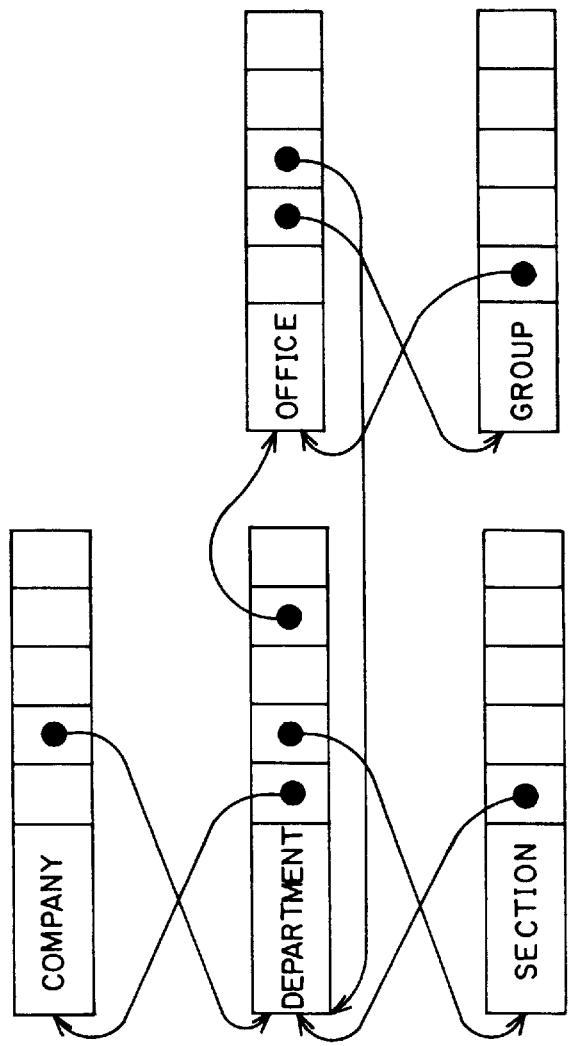
FIG. 4B shows an example of a pointer structure of the organization template in the information management system of the present invention.
Figure 4A:
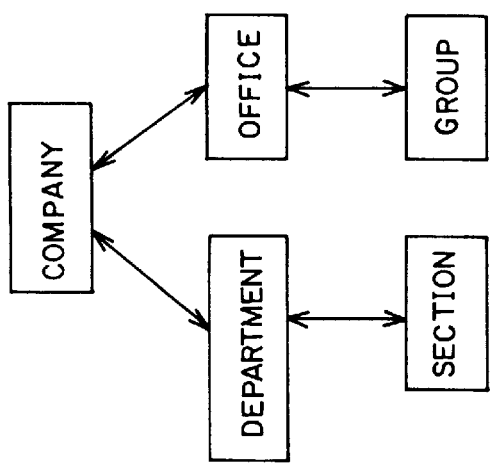
FIG. 4A shows an example of a general form of an organization template in the information management system of the present invention.

FIG. 4A shows an example of a general form of an organization template. Below a company record there are placed a department or office record. Below the department record there is placed a section record. Below the office record there is placed a group record. FIG. 4B shows an example of a pointer structure in the organization template. As shown, among the records comprising the organization template upward, downward, forward, and rearward pointers are set as needed.

Figure 5B:
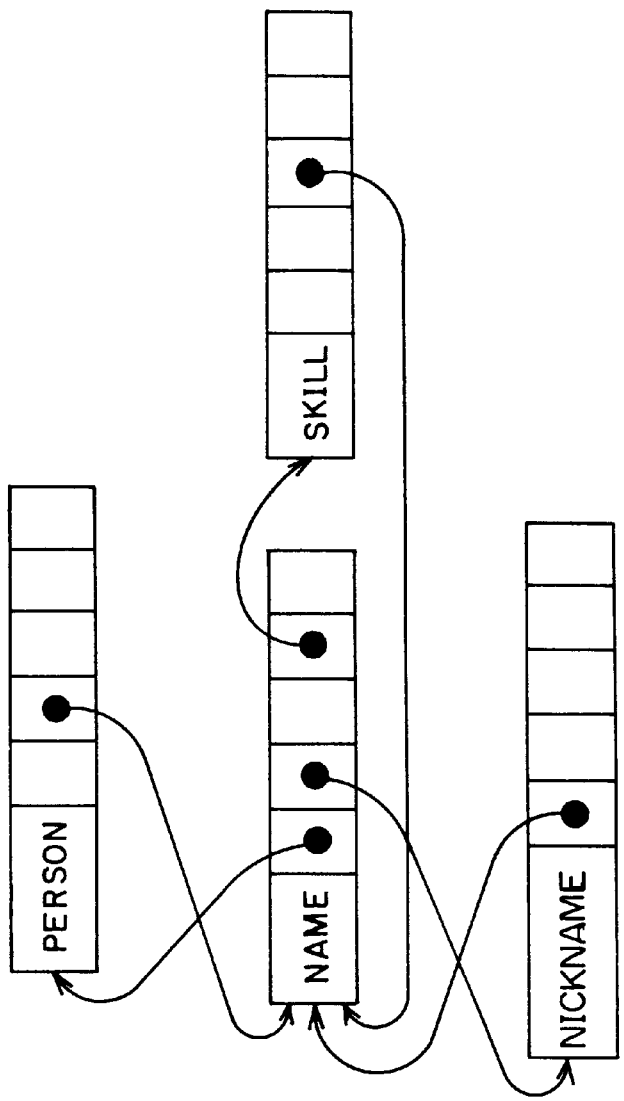
FIG. 5B shows an example of a pointer structure of the employee template in the information management system of the present invention.
Figure 5A:
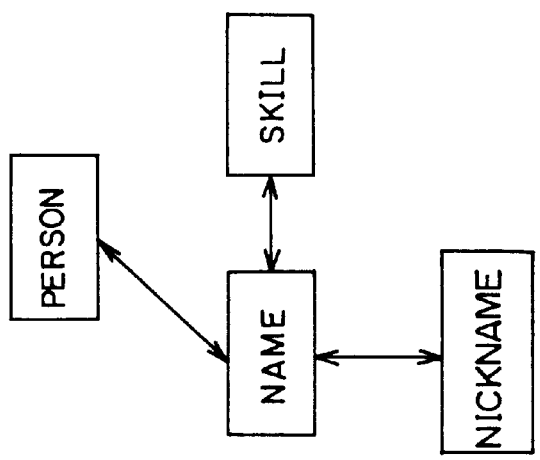
FIG. 5A shows an example of a general form of an employee template in the information management system of the present invention.

FIG. 5A shows an example of a general form of an employee template. FIG. 5B shows the structure of pointers used in the employee template. In the employee template, below a person (employee) record there is placed a name record. As a record in the same rank as the name record there is placed a record of skill There is placed an nickname record below the name record.

Figure 6B:
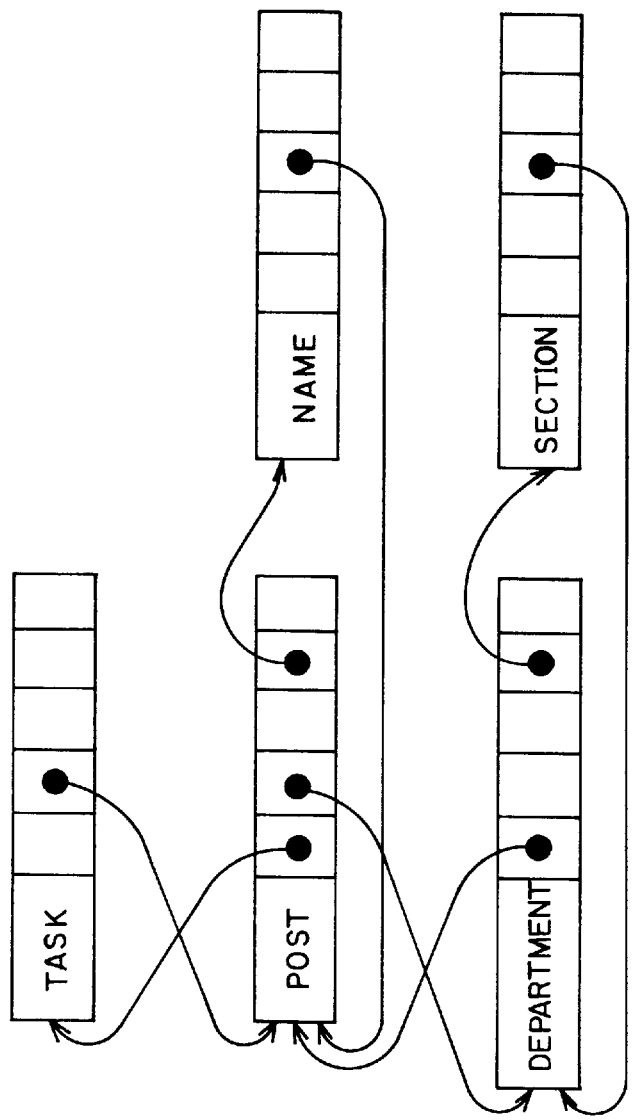
FIG. 6B shows an example of a pointer structure of the nexus template in the information management system of the present invention.
Figure 6A:
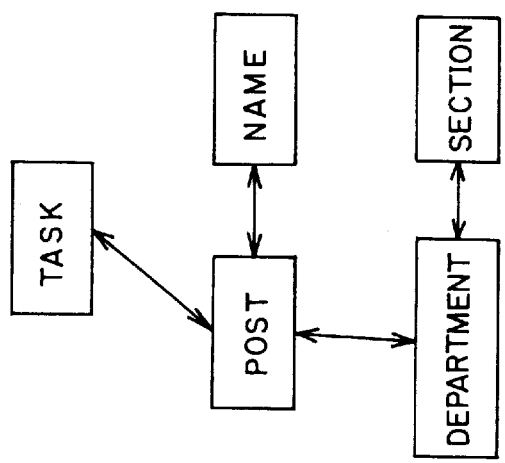
FIG. 6A shows an example of a general form of a nexus template in the information management system of the present invention.

FIG. 6A shows an example of a general form of a nexus template indicating relationships among entity information items stored in entity management tables (to be described later) for managing entity information items, which correspond to the organization template and the employee template. FIG. 6B shows the pointer structure in the nexus template. In the nexus template, there are stored a task record in the highest rank, a post record in the next rank, and a department record below the post record. A name record is placed in the rear of the post record. Further, a section record is placed in the rear of the department record. For example, the number of sections placed below the post are stored in the condition storage area of the section record.

Figure 7:
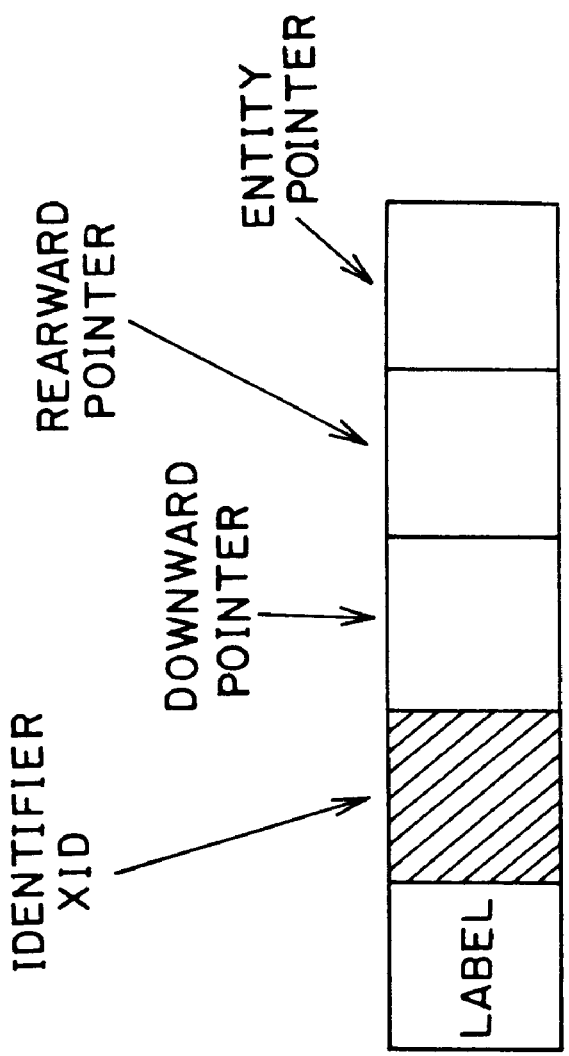
FIG. 7 shows an example of a format of a record in an entity management table of the present invention.

FIG. 7 shows an example of a format of a record in an entity management table in which entity information items are stored, which corresponds to each of the above-described structure management tables, i.e., templates. One record in the entity management table corresponds to one entity information item, which is headed by a label name for that entity information item, followed by an identifier XID unique to that entity information item, a pointer to a record in the low rank, a pointer to a record in the rear rank, and ended by a pointer to an entity information item (an entity pointer).

Figure 8:
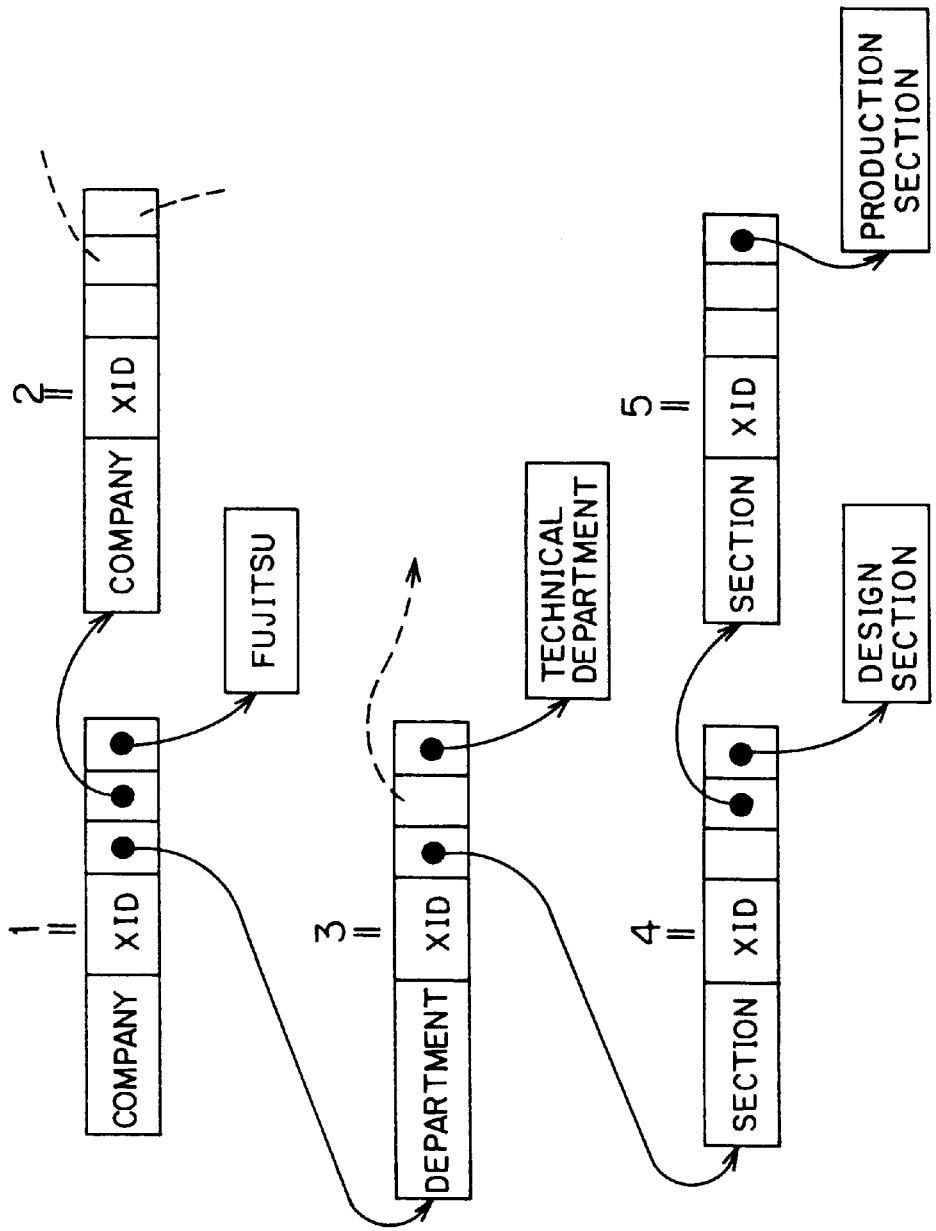
FIG. 8 shows an example of an organization entity management table in the information management system of the present invention.

FIG. 8 shows an example of an entity management table corresponding to the organization template shown in FIGS. 4A and 4B. In FIG. 8, "FUJITSU" is stored as an entity information item corresponding to the company record in which XID=1. The record points to a company record in which XID=2 by the rearward pointer as a record of the same rank and further points to a lower department record in which XID=3 whose entity information is "technical department". There are two section records pointed to by the department record. A section record whose entity information is "production section" is pointed to by a rearward pointer to a record in the rear rank stored in a section record whose entity information is "design section". Thus, for records of two sections belonging to the same department, the downward pointer is set in only the leading record. The lower records having the same high record are linked by the rearward pointers.

FIG. 9 shows an example of an entity management table corresponding to the employee template of FIGS. 5A and 5B. As in FIG. 8, below a person record in which XID=11 there is placed a name record in which XID=13. A pointer to a record in the rear rank in the name record points to a skill record in which XID=14. A nickname record is placed below the name record. The entity pointer of name points to entity information "JOHN SMITH". The entity pointer of skill points to "manager", and the entity pointer of nickname points to "123456".

In this case, the person record that is the highest record in the employee entity management table has no corresponding entity information and stores no entity pointer. The person record groups together its lower records of name, skill and nickname and is used for discrimination against other records of name, etc.

Figure 10:
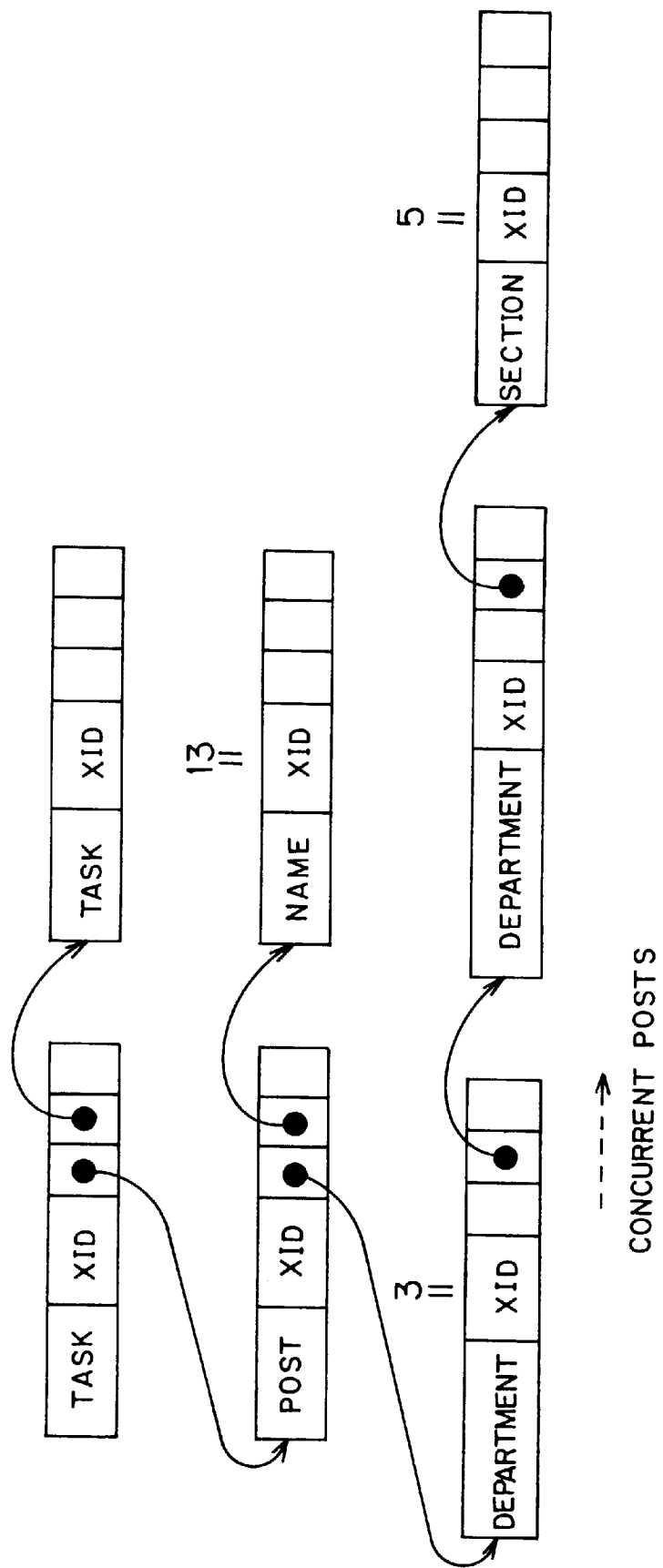
FIG. 10 shows an example of a nexus entity management table in the information management system of the present invention.

FIG. 10 shows an example of an entity management table corresponding to the nexus template of FIGS. 6A and 6B. The pointer structure is the same as that in FIGS. 8 and 9. This entity management table is used to establish relationships among entity information items stored in the organization entity management table of FIG. 8 and the employee entity management table of FIG. 9. This implies that there is no need of storing pointers to entity information items themselves in this table. In FIG. 10, two department sections and one section record, which are lower records of the record of post, indicates that these posts are served concurrently.

The records of task and post of FIG. 10 are not present in the organization entity management table and the employee entity management table. These records symbolize a set (object) of lower records and have thus no corresponding entity information items.

Figure 11:
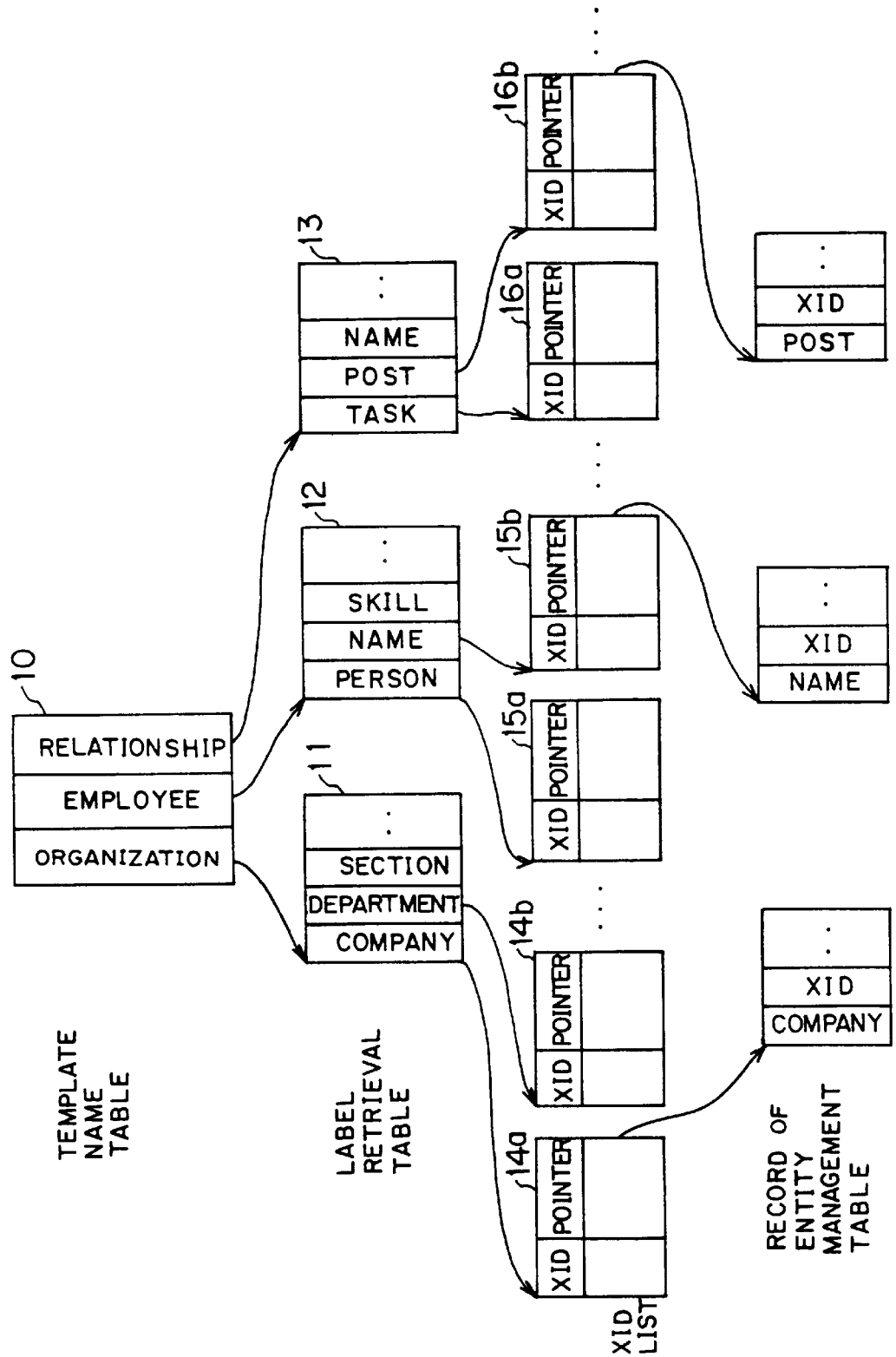
FIG. 11 shows an XID management table in the information management system of the present invention.

FIG. 11 shows an example of an XID management table needed to retrieve one information item and other related information items stored in the database 7. In FIG. 11, the XID management table comprises a template name table 10, label retrieval tables 11, 12 and 13 which respectively correspond to the templates stored in the template name table, and XID lists 14a, 14b, . . . , 15a, 15b, . . . , 16a, 16b, . . . which are respectively correspond to the labels in all the label retrieval tables.

In the template name table 10 are stored pointers to the label retrieval tables 11, 12 and 13 which store label names of records stored in the respective templates according to the names of all of the templates, which are, in the above example, the organization template, the employee template, and the nexus template. In each of the label retrieval tables 11, 12 and 13 are stored pointers to the XID lists corresponding to the respective label names. For example, there are provided XID lists 14a, 14b,. . . , each of which corresponds to a respective one of label names, i.e., company, department, section, etc., which are stored in the label retrieval table 11 corresponding to the organization template. In each XID list, there are stored an XID value of an entity information item of a record in the above entity management table and a pointer to that record in pairs for all records having the corresponding label name.

Figure 12A:
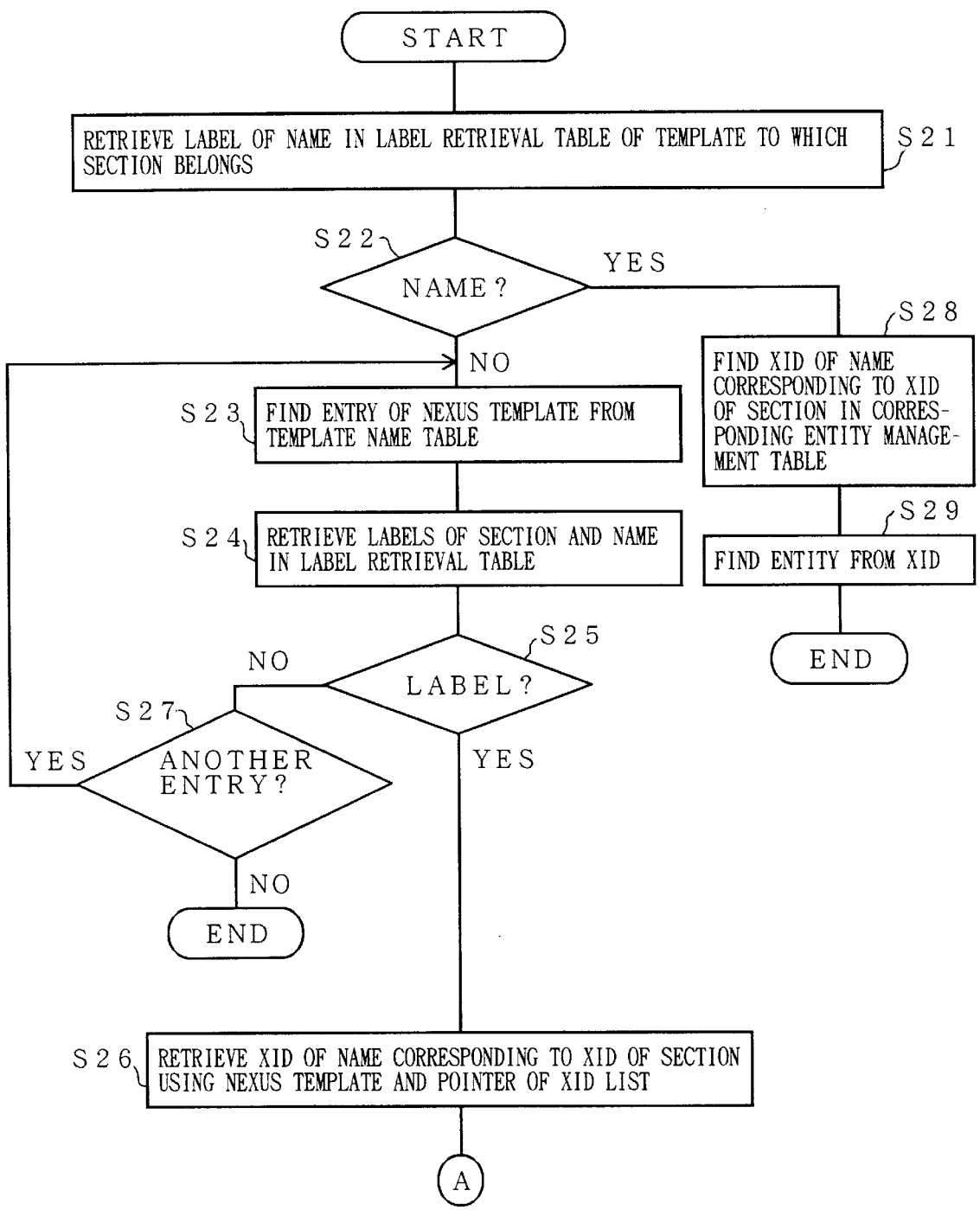
FIGS. 12A and 12B are a flowchart for data retrieval according to the present invention.
Figure 12B:
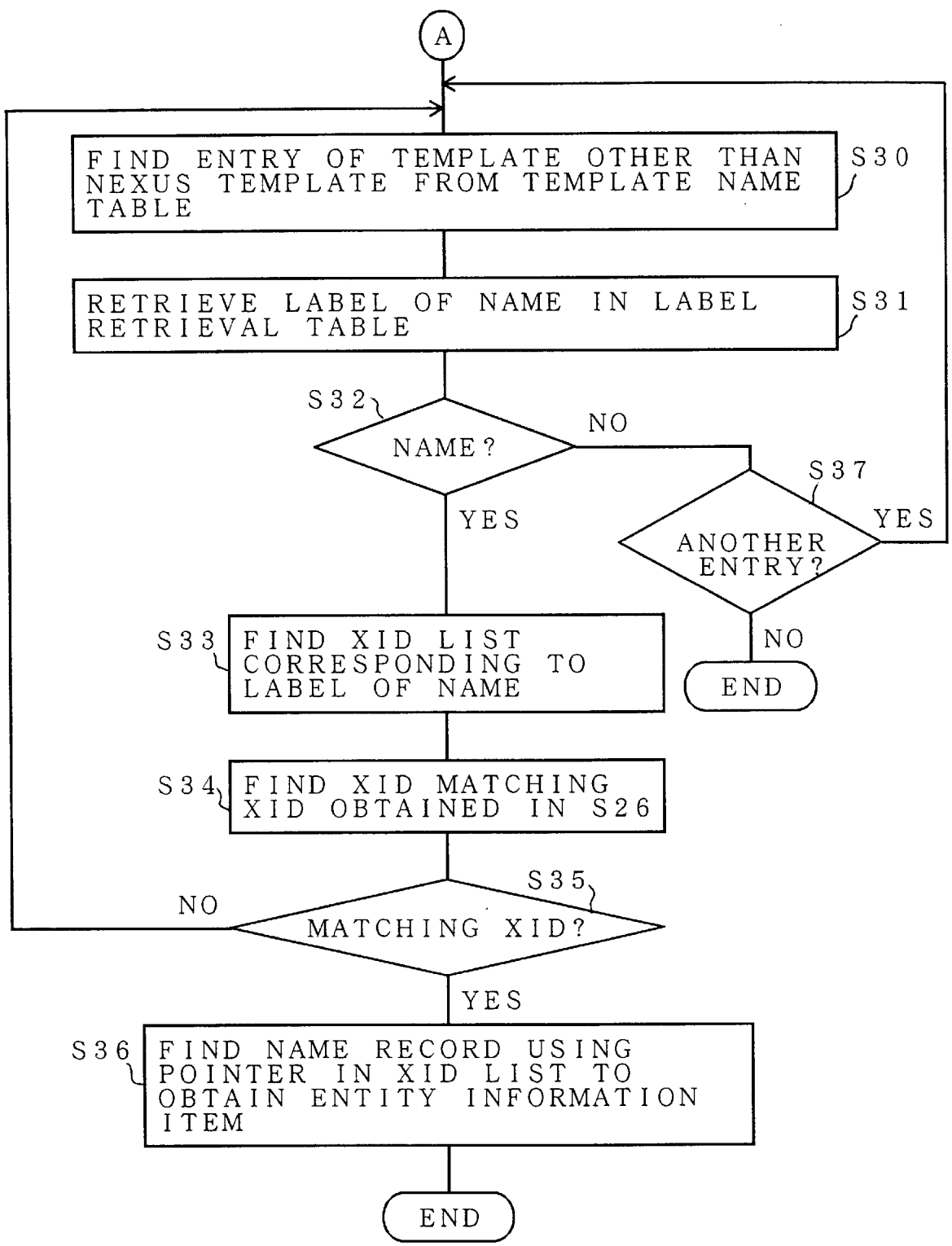
Figure 12C:
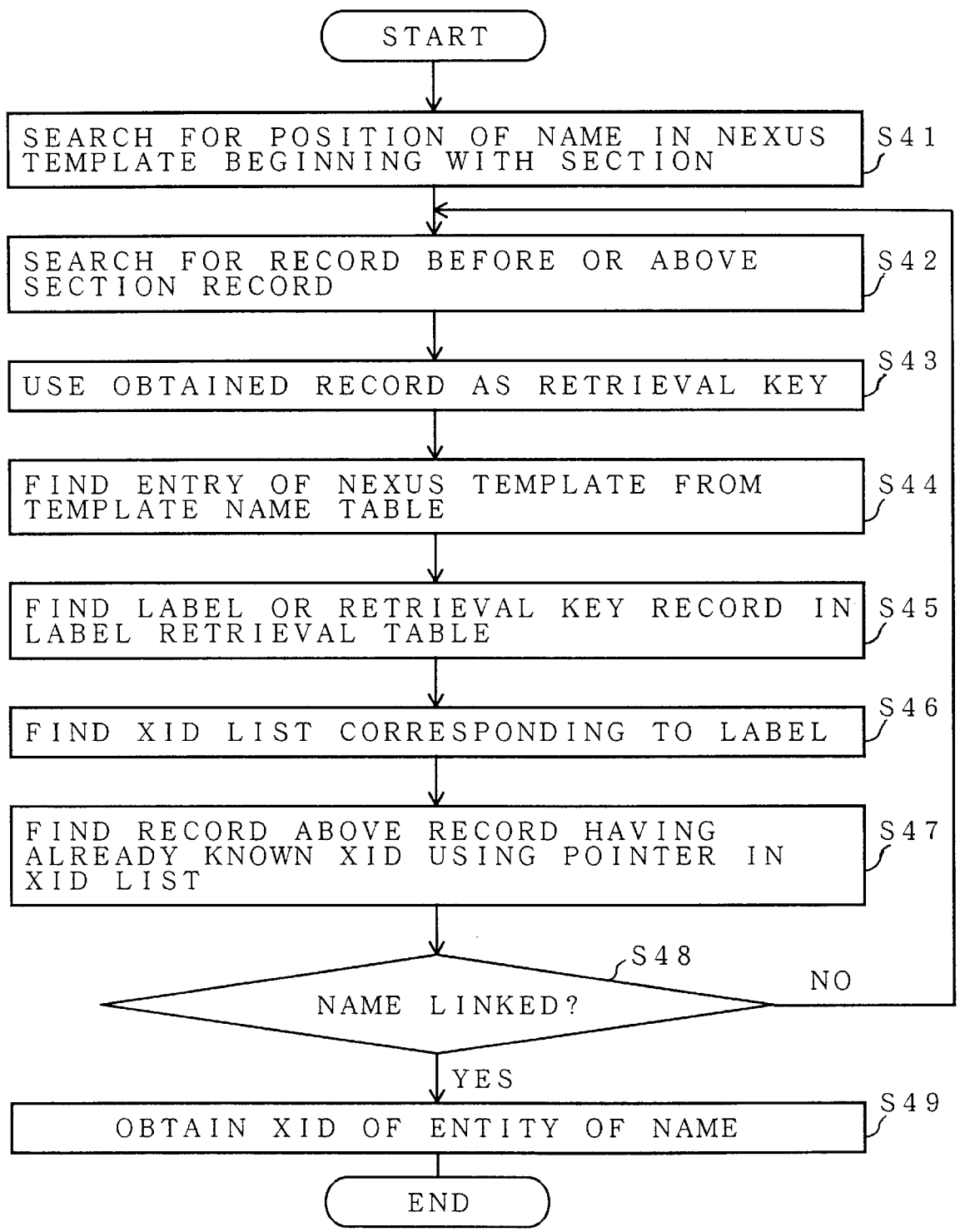
FIG. 12C is a detailed flowchart for the data retrieval according to the present invention.

FIGS. 12A and 12B are a process flowchart illustrating the retrieval of one information item and other related information items by the processor unit 5 through intermediation of the XID management table of FIG. 11 taking, as an example, a name retrieval for finding a name of a chief of a section from a name of that section whose XID is already known. FIG. 12C is a detailed flowchart for the processing in step S26 of FIG. 12A.

In FIG. 12A, at the start of processing execution, an entry of a template to which that section belongs, e.g., the organization table, is retrieved from the template name table 10 of the XID management table of FIG. 11 in step S21. In the label retrieval table 11 pointed to by that entry, an entry of name is retrieved with name as a retrieval key.

If the label of name is found in step S22, then a record of section having the XID already known is retrieved from the corresponding entity management table and then the XID of a record of name is obtained using a pointer stored in that section record in step S28. Next, the XID of the name is used to find its entity information item in step S29 and then the process terminates. If the name record obtained in step S29 contains an entity pointer, then the entity of the name will be directly obtained by using that pointer.

In the case of the organization template, the label retrieval table 11 has no name label. In step S23, therefore, an entry of the nexus template is retrieved from the template name table 10. In step S24, labels of section and name are retrieved from the label retrieval table 13 pointed to by that entry.

In the absence of one of labels of section and name in step S25, the process returns to step S23 to find an entry of another nexus template when there are more than one nexus templates. And the step S24 is repeated. The process terminates if only one nexus template exists or if no next entry is found as a result of the search of the label retrieval tables of all of the nexus templates in step S27. In this case, it is seen that the name label does not exist from the beginning or a section-to-name correspondence is not established. Accordingly, the name of the section chief cannot be found.

For example, the nexus template of FIG. 6B has both of the labels of section and name. In step S26, therefore, the name XID corresponding to the section XID already known is retrieved using pointers of the nexus template and the XID list. The retrieval processing in step S26 is illustrated in detail in FIG. 12C.

In step S41 of FIG. 12C, the position of a name record is searched for beginning with a section record by using a pointer in the nexus template. In step S42, a record that is before or above the section record in rank is searched for and that record is chosen as a retrieval key in step S43. In step S44, an entry of the nexus template is found from the template name table 10 of FIG. 11. In step S45, the corresponding label in the label retrieval table 13 pointed to by that entry is found. In step S46, the XID list corresponding to that label is found, and in subsequent step S47, a record that is above the section record having the above-described XID already known is found. In subsequent step S48, an examination is made as to whether the record obtained in the nexus entity management table is linked to a name record. If linked, then the XID of the entity of the name is obtained in step S49. If not linked to the name record, on the other hand, the process from step S42 to S47 is repeated. Consequently, a record that is before or above the name record in rank will be chosen as a retrieval key.

In the present embodiment, the nexus template of FIG. 6B is used to obtain a department record that is before the section record in rank in step S42. Next, that department record is used as a retrieval key (S43) to thereby find a label of department within the label retrieval table 13 (S45) and the corresponding XID list (S46). Subsequently, the records within the nexus entity management table pointed to by pointers in the department XID list are searched for a department record that is above the section record having the XID already known (S47). In the nexus entity management table of FIG. 10, however, the name record is not linked to the department record. This means that the name record cannot be retrieved by the department record. Thus, the process returns to step S42 to obtain a post record that is above the department record within the nexus template of FIG. 6B.

Next, the post record is used as a retrieval key (S43) to thereby find the label of post in the label retrieval table 13 of FIG. 11 (S45) and then the corresponding XID list 16b (S46). Subsequently, a search is made of the records within the nexus entity management table pointed to by pointers in the XID list 16b for a post record that is above the section record having the known XID (S47). In the nexus entity management table, the name record is linked to the post record. In subsequent step S49, therefore, the name record pointed to by the rearward pointer of the post record obtained in step S47 is searched for and its XID is obtained.

In this way, in the data retrieval processing of FIG. 12C, a record that is before a record serving as a starting point within the template is first found. If access to the desired record cannot be obtained by the corresponding record in the entity management table, then a record that is further before in rank is searched for. When access to the desired record cannot be obtained even if a search is made of all the records that are in the same rank as the record serving as the start point, a search is next made for a higher record. Sequential retrieval of records that are in the same rank as that higher record is performed This process is repeated. If access to the desired record is permitted, then its XID is obtained.

The nexus entity management table stores only XIDs of entities of names, but not pointers to entity information items. Thus, the process of finding the name as an entity information item is continued in steps following step S30 in FIG. 12B.

First, in step S30, an entry of other templates than the nexus template are found from the templates managed by the template name table 10 of FIG. 11. In step S31, a search is made of the contents of the label retrieval tables for a necessary label name, i.e., the label of "name" here. If the label of name is not found in step S32, another entry in the template name table 10 is found and the process returns to step S30. Then the process of step S31 is repeated. The label retrieval tables are searched for all the entries other than the nexus template. If the next entry cannot be found in step S37, then the process is terminated.

In the present embodiment, since the employee template of FIG. 5B has a name label, an XID list pointed to by the name label is obtained in the XID management table in step S33. In subsequent step S34, a search is made of the XID list for an XID that matches the XID obtained in step S26. A decision is then made in step S35 as to whether or not there is a match in XID.

If there is a match, then an entity of the name record pointed to by the pointer corresponding to that XID is obtained as a result of retrieval in step S36. Then, the process terminates. If there is no match, on the other hand, then the process returns to step S30 to repeat the retrieval of the name label from the label retrieval table corresponding to the other template. The repetition of the process is due to the general fact that there are more than one labels having the same name in the label retrieval tables.

If the nickname of the section chief rather than his name is to be sought, then the labels of section and employee will be retrieved in step S24. In this case, since the nexus template of FIG. 6B has no label of nickname, a template having a nickname label is searched for. It will appreciated here that the employee template has a nickname label and a name label existing in the nexus template. A search is made, in the employee template, for records that are in high, low, front and rear ranks with respect to the name record with name as an indirect key to thereby examine whether there is a nickname record among them. As a result, it will be found that there is the employee record below the name record. Thus, the XID of the name of the section chief is found in accordance with the flow of FIG. 12A and the nickname record pointed to by the corresponding name record in the employee entity management table. Then, the entity information item pointed to by the entity pointer of that record is read out as the nickname of the section chief.

If there is no record of nickname among records that are in the high, low, front and rear ranks with respect to the name record in the employee template, or if the record of nickname in the employee entity management table stores no entity pointer, then a search is made of another template.

In the data retrieval according to the present invention, a retrieval path (retrieval procedure) which meets retrieval conditions is first determined by using templates. To find an entity information item such as a name, a retrieval path having an desired entity information item is determined. Prior to retrieval based on XID, a decision can be made as to whether or not the results that meet retrieval conditions can be obtained by using templates.

The retrieval from the nexus entity management table having no entity pointers is also possible. If a path by which information is pointed to can be known, any other retrieval is permitted.

So far, the information management system at which the present invention aims has been described in detail. Hereinafter, a process schedule control system based on the information management system will be described FIG. 13 specifically illustrates, in block diagram form, that process schedule control system.

Figure 13:
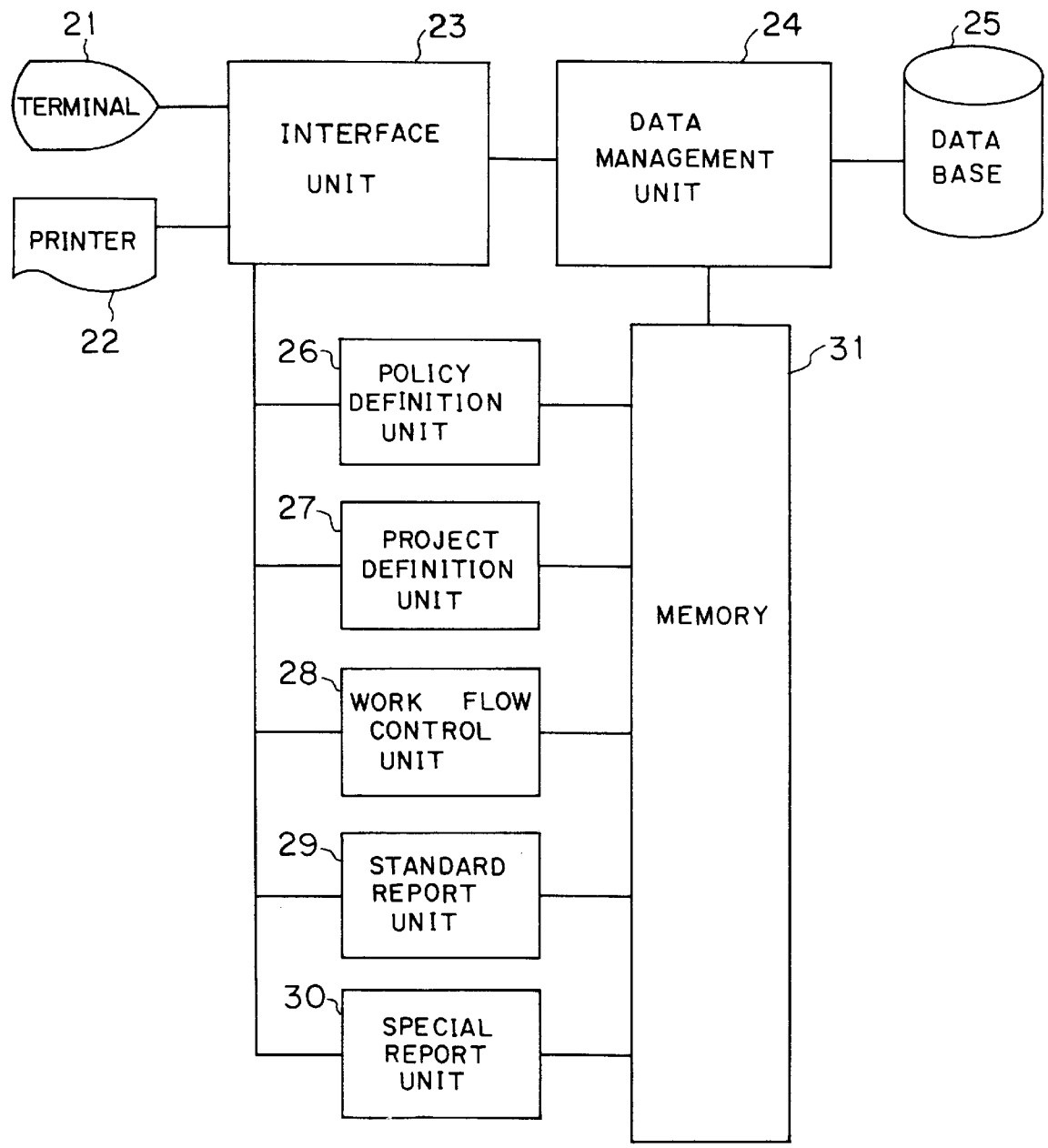
FIG. 13 is a simplified schematic block diagram of a process schedule control system using the information management system of the present invention.

The process schedule control system of FIG. 13, which is a more specific form of the information management system of FIG. 2, comprises a terminal 21, a printer 22, an interface unit 23, a data management unit 24, a database 25, a policy definition unit 26, a project definition unit 27, a work flow control unit 28, a standard report unit 29, a special report unit 30, and a memory 31.

The policy definition unit 26 generates on the memory 31 structure management tables for defining routine work that becomes an object of schedule control as routine work templates, which, in turn, are entered via the data management unit 24 into the database 25. Similarly, the project definition unit 27 sets values appropriate to actual work to the routine work defined by the policy definition unit 26 as the contents of entity management tables by way of example and generates a corresponding XID management table, which are entered into the database 25.

The work flow control unit 28 manages the start and end of work in a process using the templates, the entity management tables and the XID management table and provides necessary information on working instructions to a worker through the interface unit 23. The worker enters the results of work from the terminal 21, which are sent to the work flow control unit 28.

The standard report unit 29 creates a report on the difference between the schedule of work and the actual results thereof on the basis of the results of work which have been entered into the work flow control unit 28 and provides it to the terminal 21 or the printer 22. The special report unit 30 records and manages historical information such as information on a person who developed a subroutine of a certain number for that work four years ago for example, and outputs it in response to an inquiry about it.

The data management unit 24 controls reading or writing of data between the database 25 and the memory 31. The interface unit 23 provides the user interface between each of the terminal 21 and the printer 22 and each of the data management unit 24, the policy definition unit 26, the project definition unit 27, the work flow control unit 28, the standard report unit 29, and the special report unit 30. The memory 31 serves as working areas and storage areas of the policy definition unit 26, the project definition unit 27, the work flow control unit 28, the standard report unit 29, and the special report unit 30.

Figure 14:
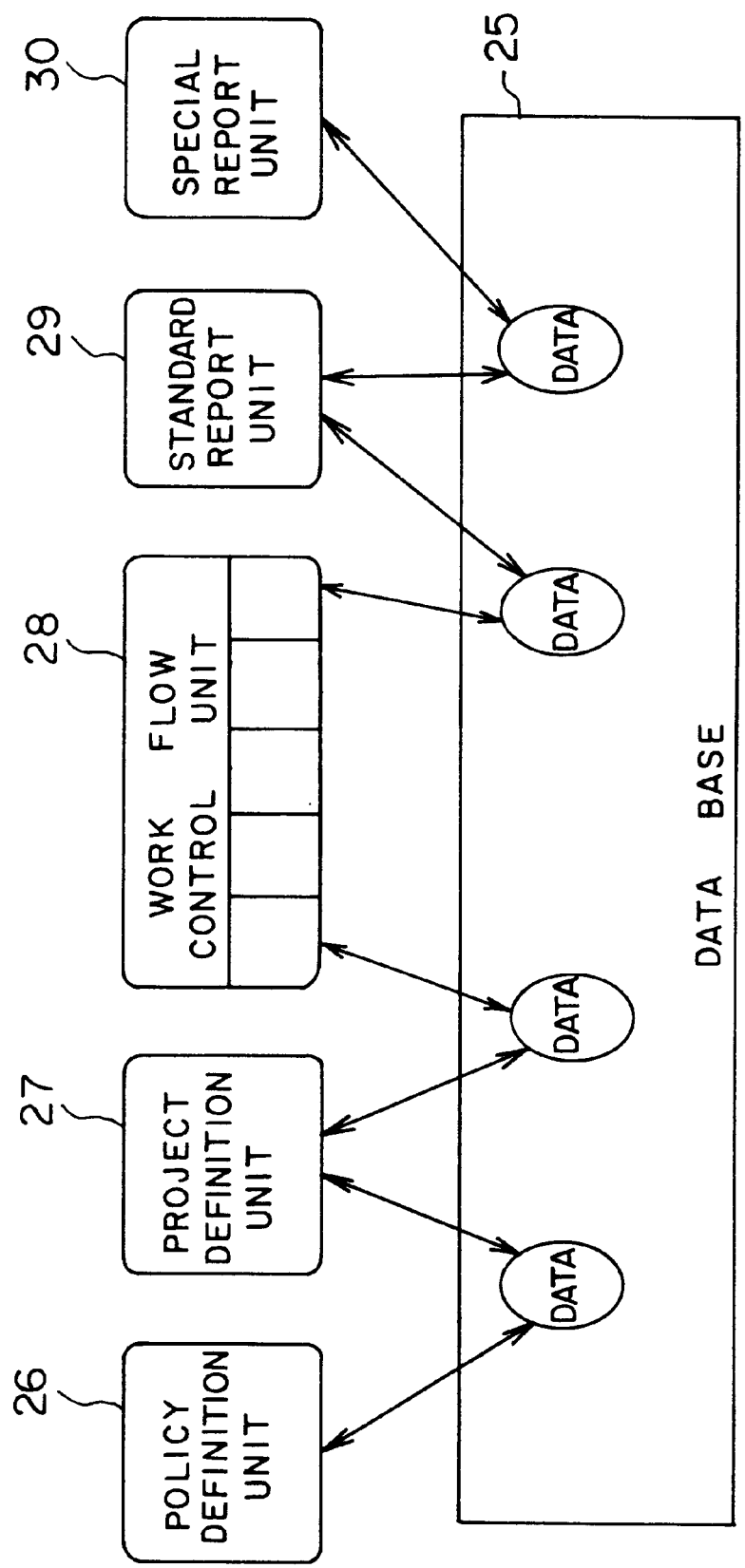
FIG. 14 shows the manner in which data is processed in the process schedule control system of the present invention.

FIG. 14 illustrates the state where the policy definition unit 26, the project definition unit 27, the work flow control unit 28, the standard report unit 29, and the special report unit 30 store generated data into the database 25 and retrieve the stored data from the database 25.

The policy definition unit 26 gives definitions by the routine work templates as described above. For example, for English manual creating work, Japanese manuscripts on a product are gathered from its developer and an order is then issued to a translator to translate them into English. In this case, information used is such that the estimated cost is 10,000 yen multiplied by a required volume and the expected number of days is the required volume divided by 10.

The project definition unit 27 sets values appropriate to actual work to correspond to the above-mentioned routine work. If the English manual is one for a word processor, then information used will be such that the development department is the word-processor development department, the product name is WP-XYZ, the required volume is 20 pages, the translator is ABC translation company, the estimated cost is 200,000 yen, and the expected number of days is two. Entity management tables are created on the basis of such information.

The work flow control unit 28 provides working instructions to a worker. At the completion of the work, the results of the work are entered by the worker. For these working instructions, a working instruction entity management table created to correspond to a working instruction template is used. Of the results entered into the work flow control unit 28, results differing from the values set by the above-described project definitions will be such that the required volume is 15 pages, the actually required cost is 150,000 yen, and the actually required number of days is three.

Figure 15:
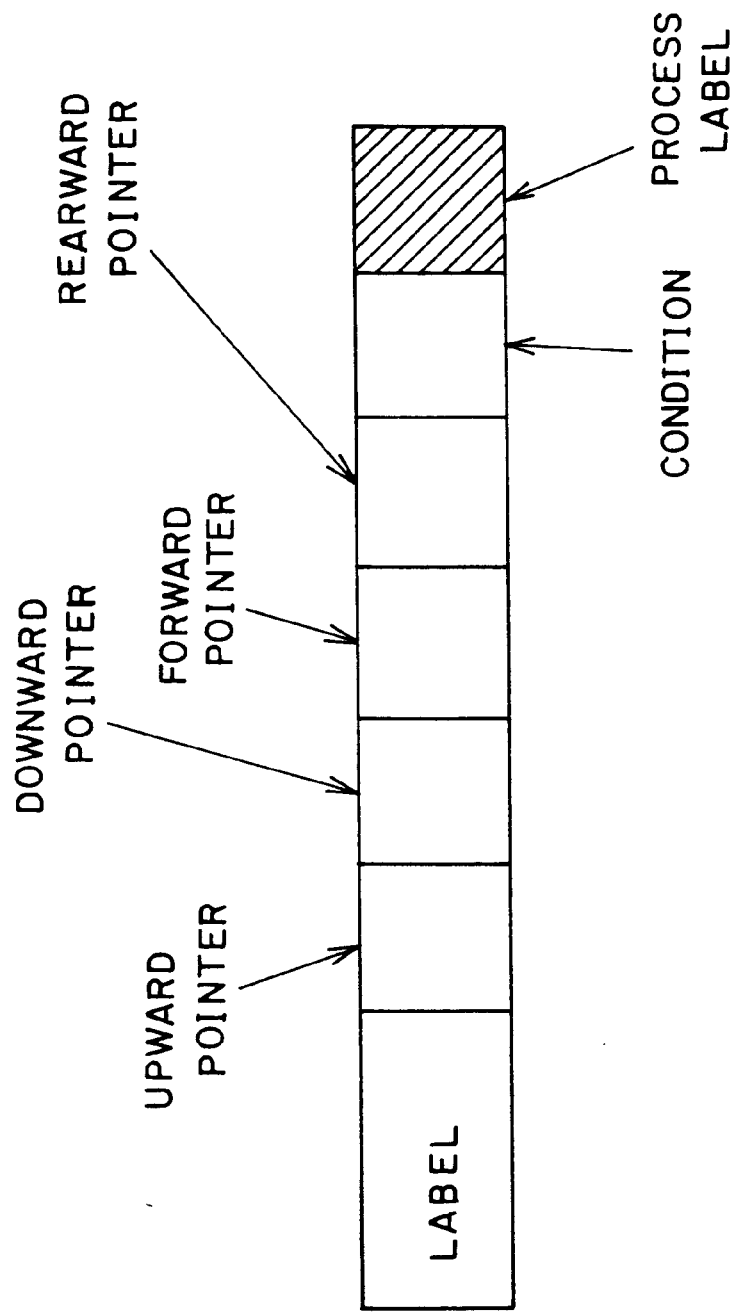
FIG. 15 shows an example of a format of a record in templates in the process schedule control system of the present invention.

FIG. 15 shows an example of a format of a record in the template used in the process schedule control system In comparison with the format of FIG. 3, this format differs only in that a process label is added to the end of the format of FIG. 3. This process label indicates a program for performing a process corresponding to that label. The addition of this label permits a process corresponding to that label to be carried out.

FIGS. 16A through 22 show specific examples of the routine work templates.

Figure 16B:
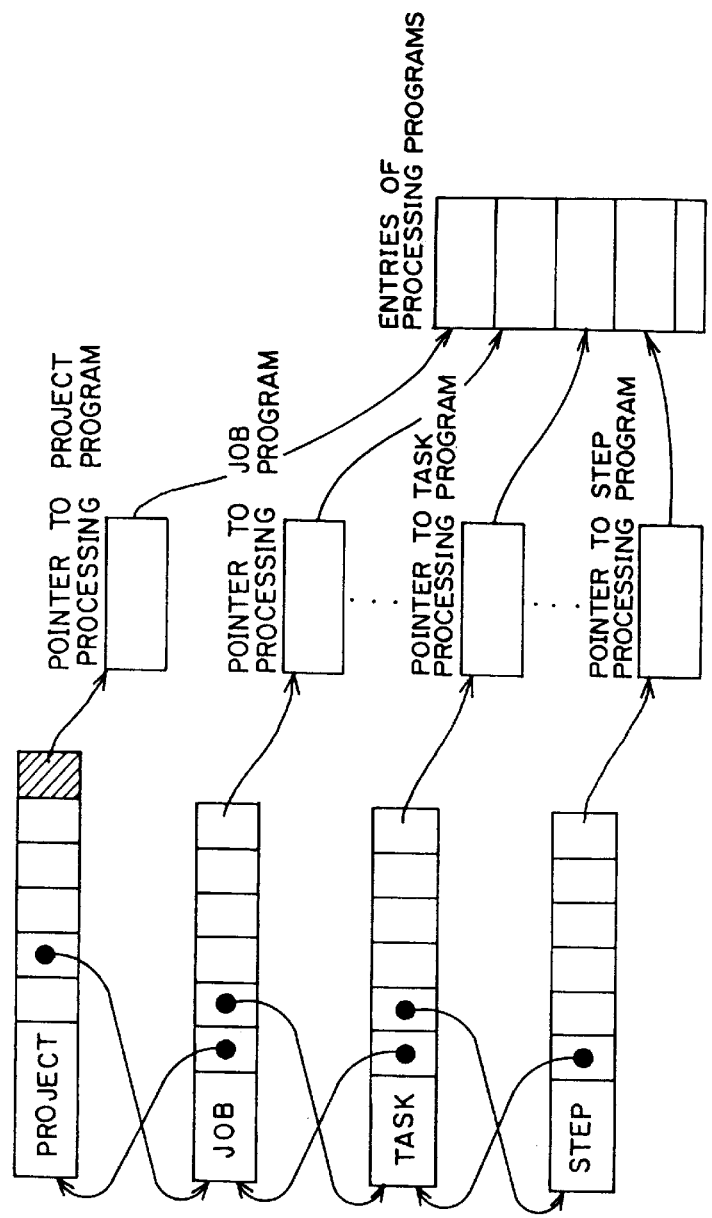
FIG. 16B shows a pointer structure of the project template in the process schedule control system of the present invention.
Figure 16A:
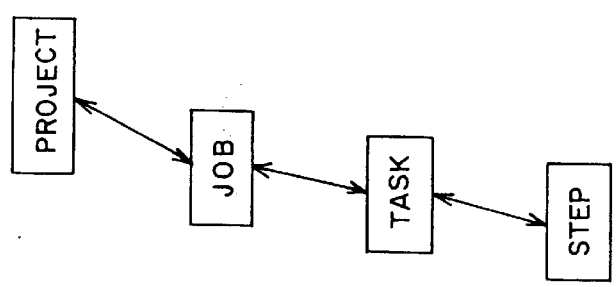
FIG. 16A shows an example of a general form of a project template in the process schedule control system of the present invention.

FIGS. 16A and 16B shows an example of a project template. Specifically, FIG. 16A shows its general form, and FIG. 16B shows its pointer structure.

In FIG. 16B, the last process label of the project record, for example, points to a pointer to a project processing program, and the entry of the processing program is pointed to by that pointer, whereby the program of that entry is executed. In practice, the process labels are registered on a program management table, and correspondingly the program entry addresses are maintained therein. When the program management table is pointed to by a process label, an program entry address is obtained and the corresponding program is executed.

Figure 17B:
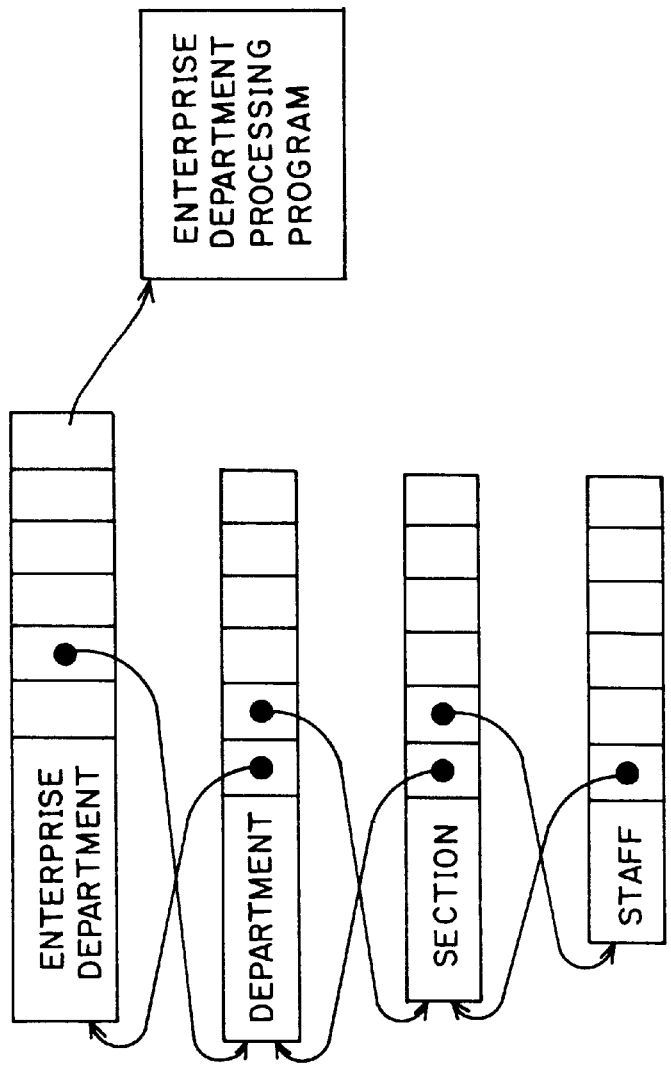
FIG. 17B shows a pointer structure of the organization template in the process schedule control system of the present invention.
Figure 17A:
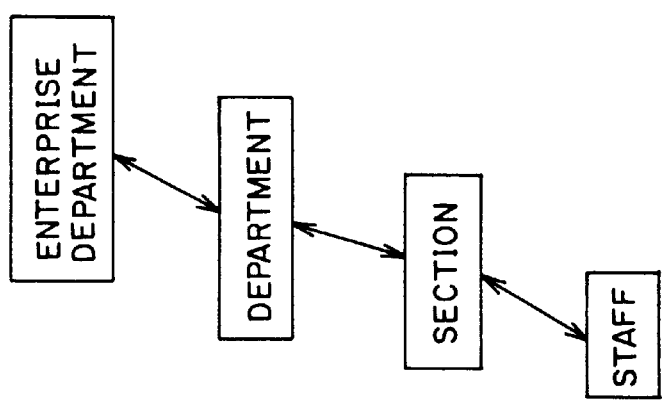
FIG. 17A shows an example of a general form of an organization template in the process schedule control system of the present invention.

FIGS. 17A and 17B show an example of a post template This template has an enterprise department record which permits a processing program for the enterprise department to be carried out.

Figure 18B:
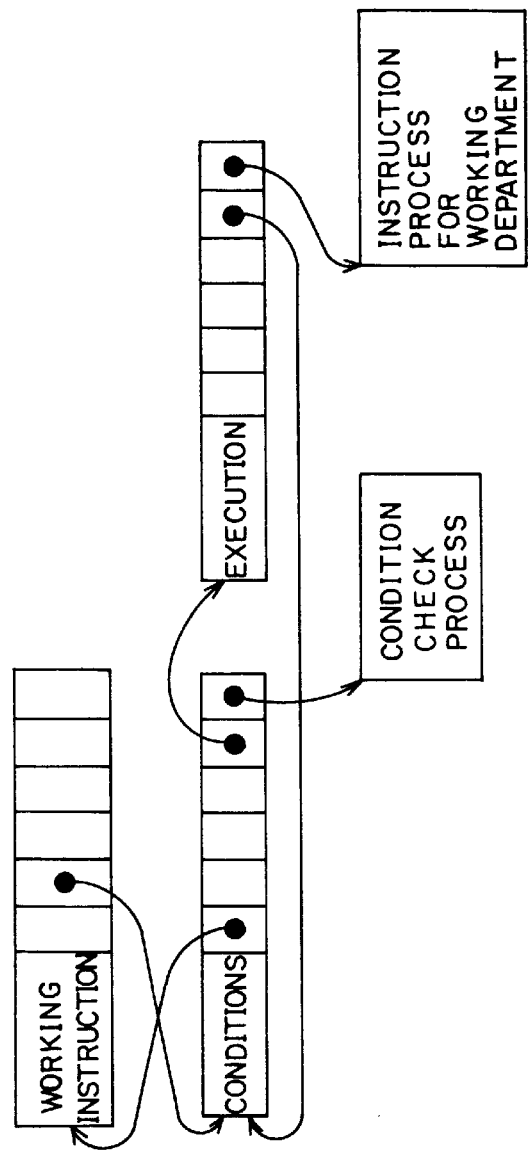
FIG. 18B shows a pointer structure of the working instruction template in the process schedule control system of the present invention.
Figure 18A:
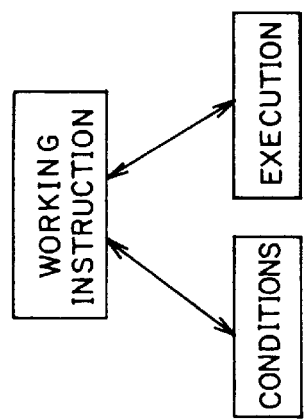
FIG. 18A shows an example of a general form of a working instruction template in the process schedule control system of the present invention.

FIGS. 18A and 18B show an example of a working instruction template. As shown in FIG. 18B, a condition record that is below a working instruction record permits condition check processing. An execution record that is in the rear of the condition record in rank permits working instructions to be given to a worker.

FIGS. 19, 20, 21 and 22 show general forms of respective nexus, staff, budget and schedule templates. Although pointer structures of these templates are not shown, they can be generated in the same way as the pointer structures in FIGS. 16B, 17B and 18B by using the format of FIG. 15.

Figure 23:
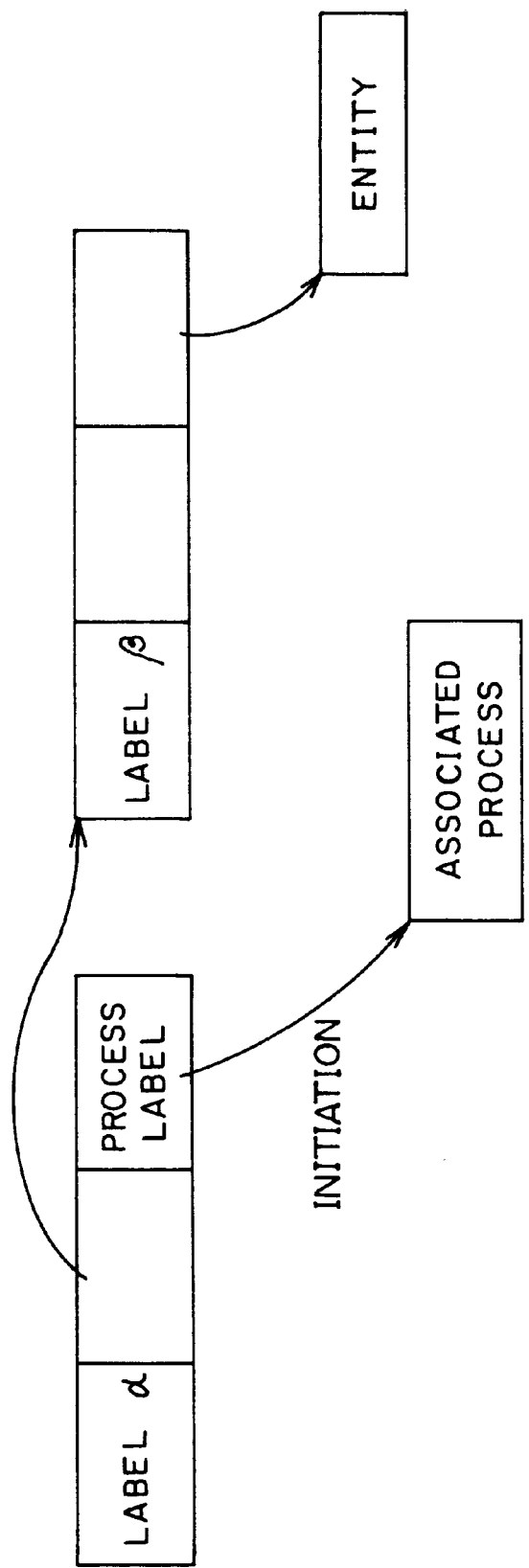
FIG. 23 shows the activation of a program for finding the entity of a rear-rank record in the process schedule control system of the present invention.

FIG. 23 illustrates the case where a program for reading an entity information item in a record that is in the rear rank is executed as a program that is initiated by the label stored at the end of a record that is in the front rank. In the process schedule control system, by associating a processing program with a template, a process corresponding to an entity written using a template is executed as described above. This permits static entities to work dynamically and the above-described work flow management to be implemented.

In FIG. 23, an associated process initiated by the process label stored at the end of a record that is in the front rank carries out a process of reading an entity corresponding to a record that in the rear rank. By way of example, this can be used to read an entity information item for a record that is in the rear rank in the information retrieval method described in conjunction with FIGS. 12A and 12B. From a template it is seen that a label that is in the rear of the label $\alpha$ in rank is a label $\beta$, for example.

The process associated with the process label stored at the end of a record of a template is not limited to reading of an entity of a record that is in the rear of that record in rank. For example, in FIG. 16B, a task execution program is read by the process label stored at the end of the task record, whereby such work as issues working instructions to workers will be performed.

FIGS. 24 through 30 show examples of entity management tables corresponding to the respective templates.

Figure 24:
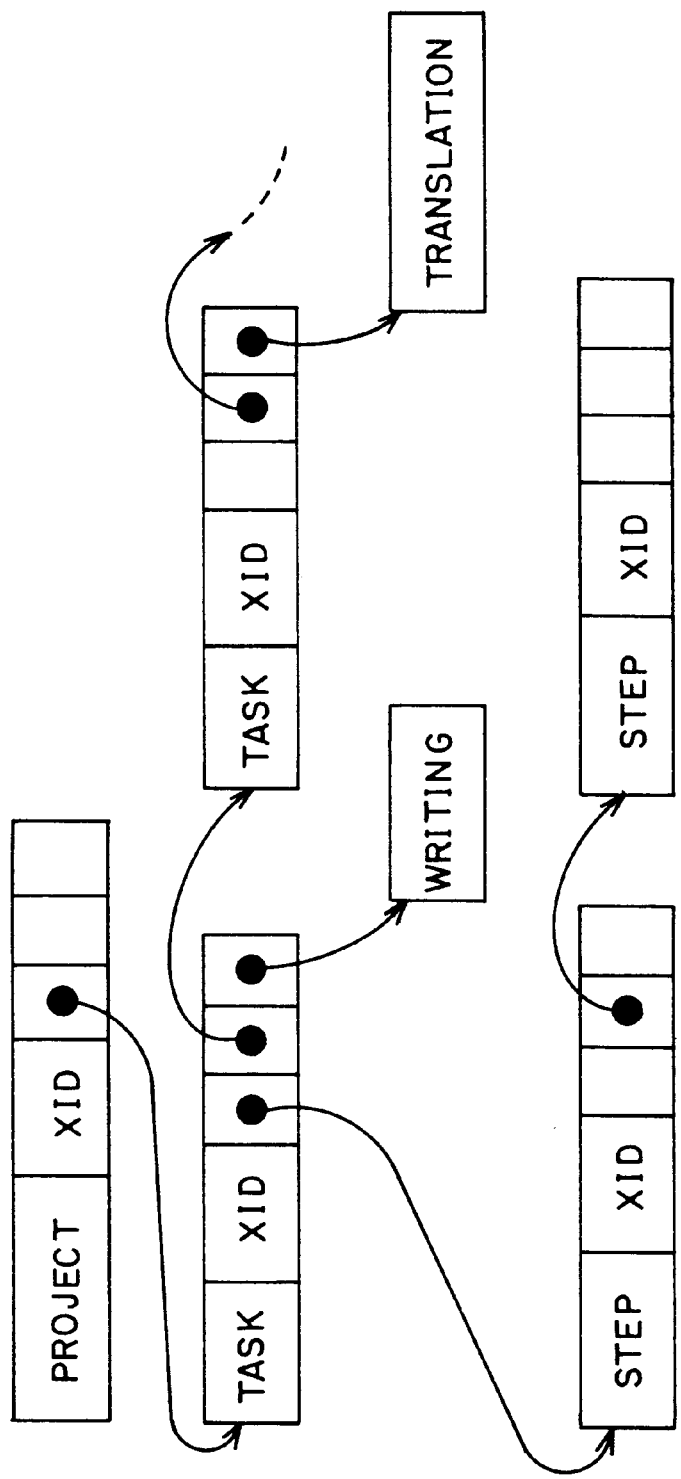
FIG. 24 shows an example of a project entity management table in the process schedule control system of the present invention.

FIG. 24 shows an example of an entity management table for the project template. As opposed to FIG. 16B, FIG. 24 shows, for simplicity, the case where a project is composed of only two tasks and hence no job record is present. A task record pointed to by the downward pointer in the project record has an entity information item of "writing", and the other task record that is in the rear rank has an entity information item of "translation".

Figure 25:
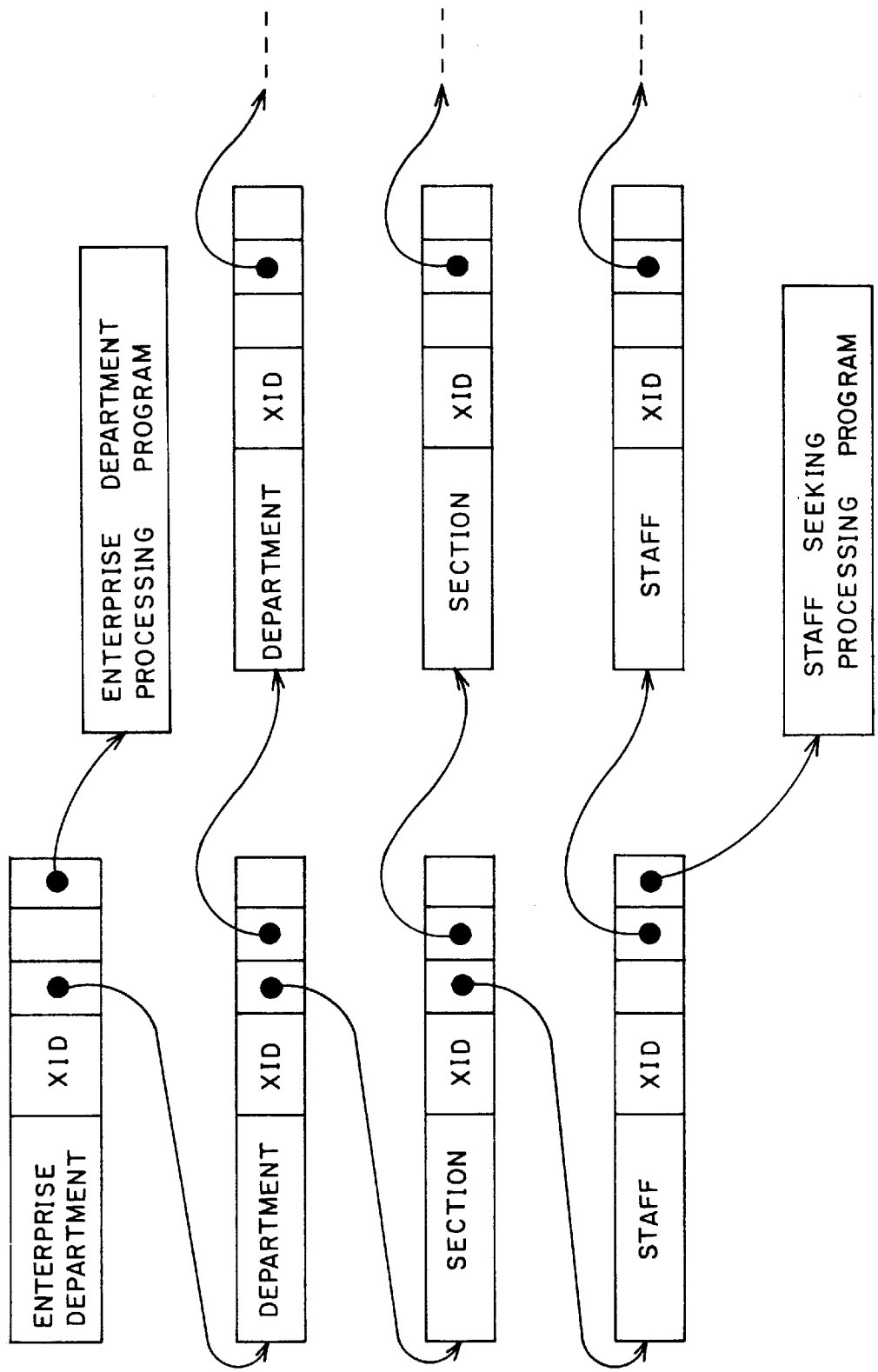
FIG. 25 shows an example of an organization entity management table in the process schedule control system of the present invention.

FIG. 25 shows an example of an entity management table corresponding to the post template. The pointer placed at the end of the enterprise department record points to a processing program for an enterprise department in place of entity information. Also, the pointer placed at the end of the staff record points to a processing program for seeking staff.

Figure 26:
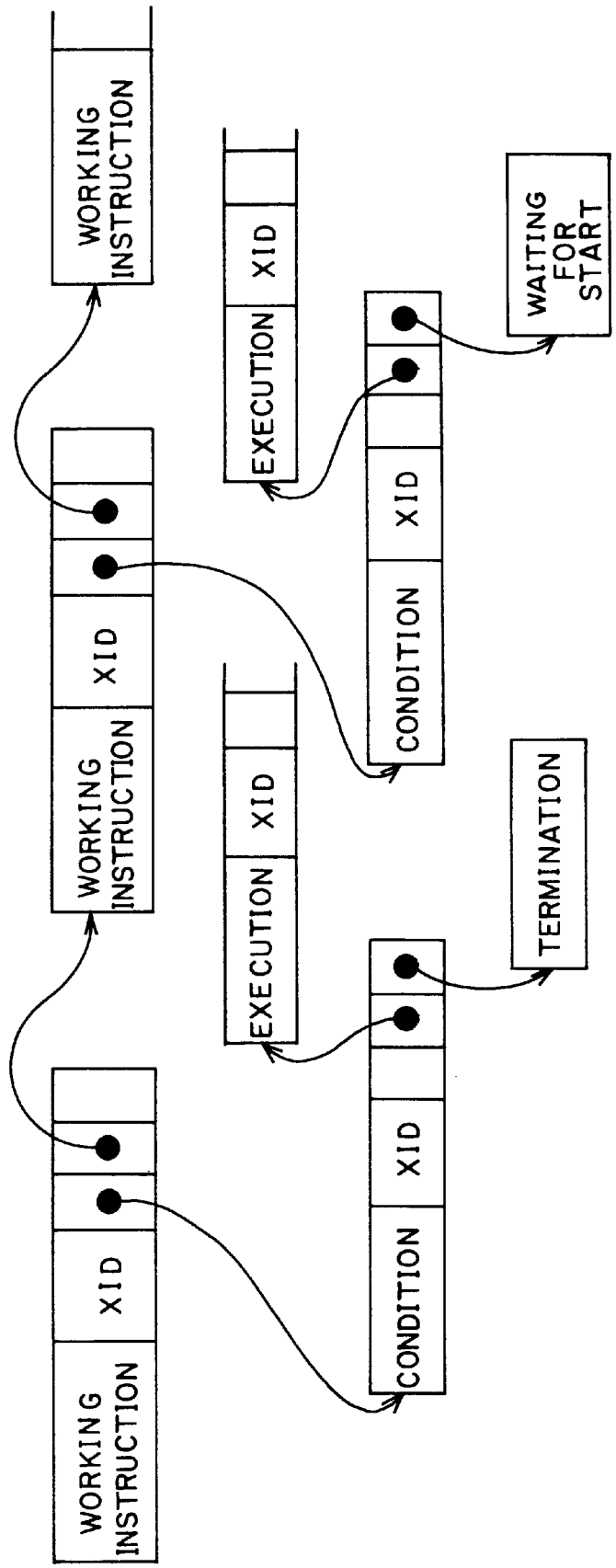
FIG. 26 shows an example of a working instruction entity management table in the process schedule control system of the present invention.

FIG. 26 shows an example of an entity management table for the working instruction template. Associated with each working instruction record are placed a low-rank condition record related to the working instruction and an execution record pointed to by the backward pointer in the condition record. For example, the condition record pointed to by the most front-rank working instruction record has an entity information item of "termination", and the condition record pointed to by the second working instruction record has an entity information item of "waiting for start".

Figure 27:
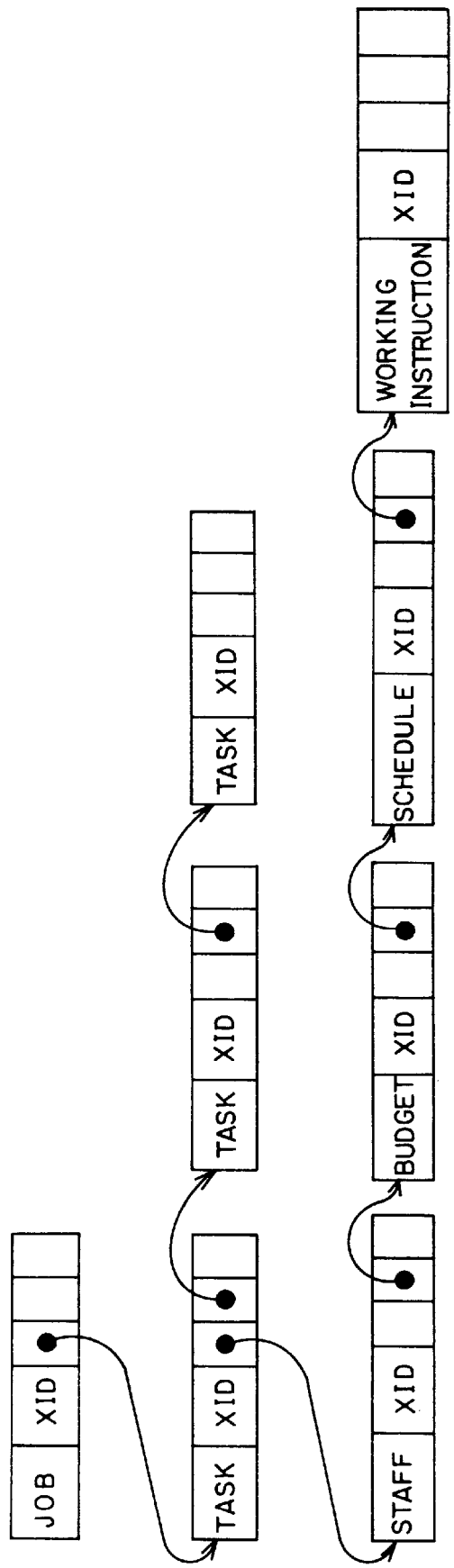
FIG. 27 shows an example of a nexus entity management table in the process schedule control system of the present invention.

FIG. 27 shows an example of a nexus entity management table. As shown, more than one task records are placed below one job record, which are linked one after another by their respective backward pointers. Below each task record are placed staff, budget, schedule and working instruction records which are linked one after another by their respective backward pointers.

Figure 28:
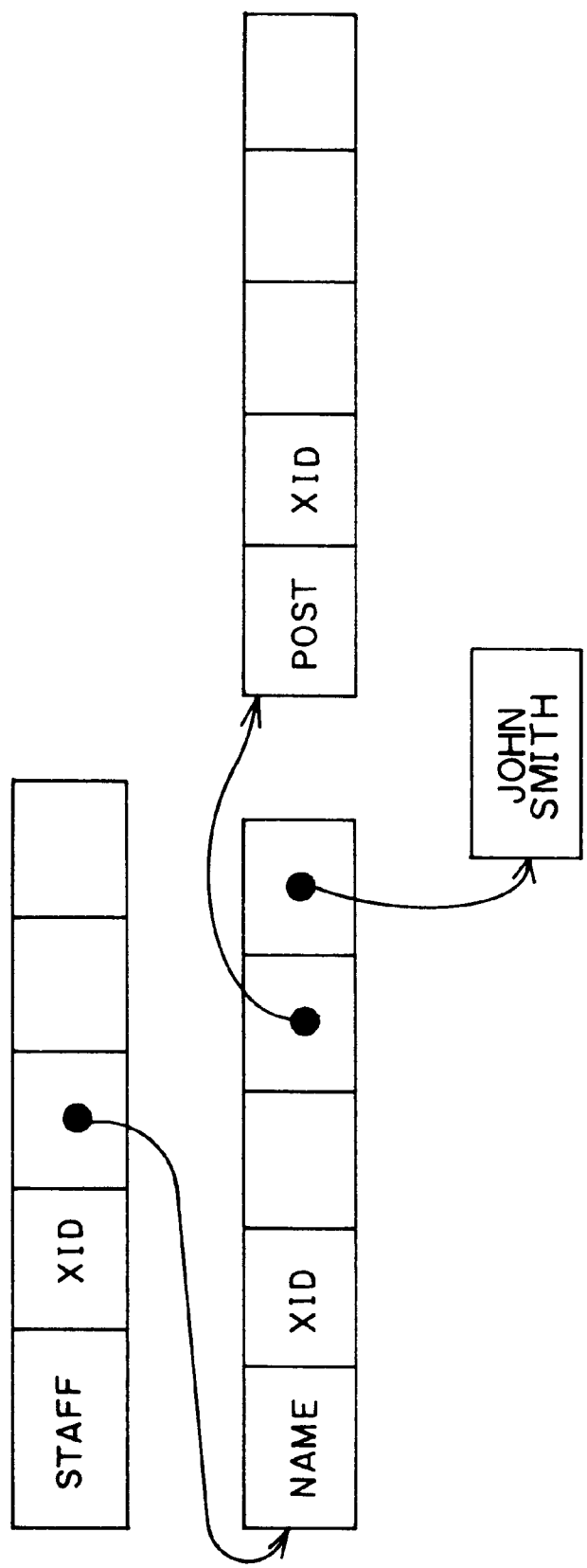
FIG. 28 shows an example of a staff entity management table in the process schedule control system of the present invention.

FIG. 28 shows an example of an entity management table for the staff template. Below a staff record is placed the name of an actual staff, "JOHN SMITH", as an entity information item. In place of such an entity, an object of the staff may be stored. A process corresponding to that object can be carried out by a processing program of a template.

For example, when company A gives an order for a task to company B, there is no need for company A to know the inside work of company B. Thus, an object is used as a facility of managing a lower structure as a whole. To be specific, a management name is attached to a set of templates or entity information items. The management name is entered as a content of an entity. When the content of the entity is found to be the management name, a process corresponding to the management name is performed.

Figure 29:
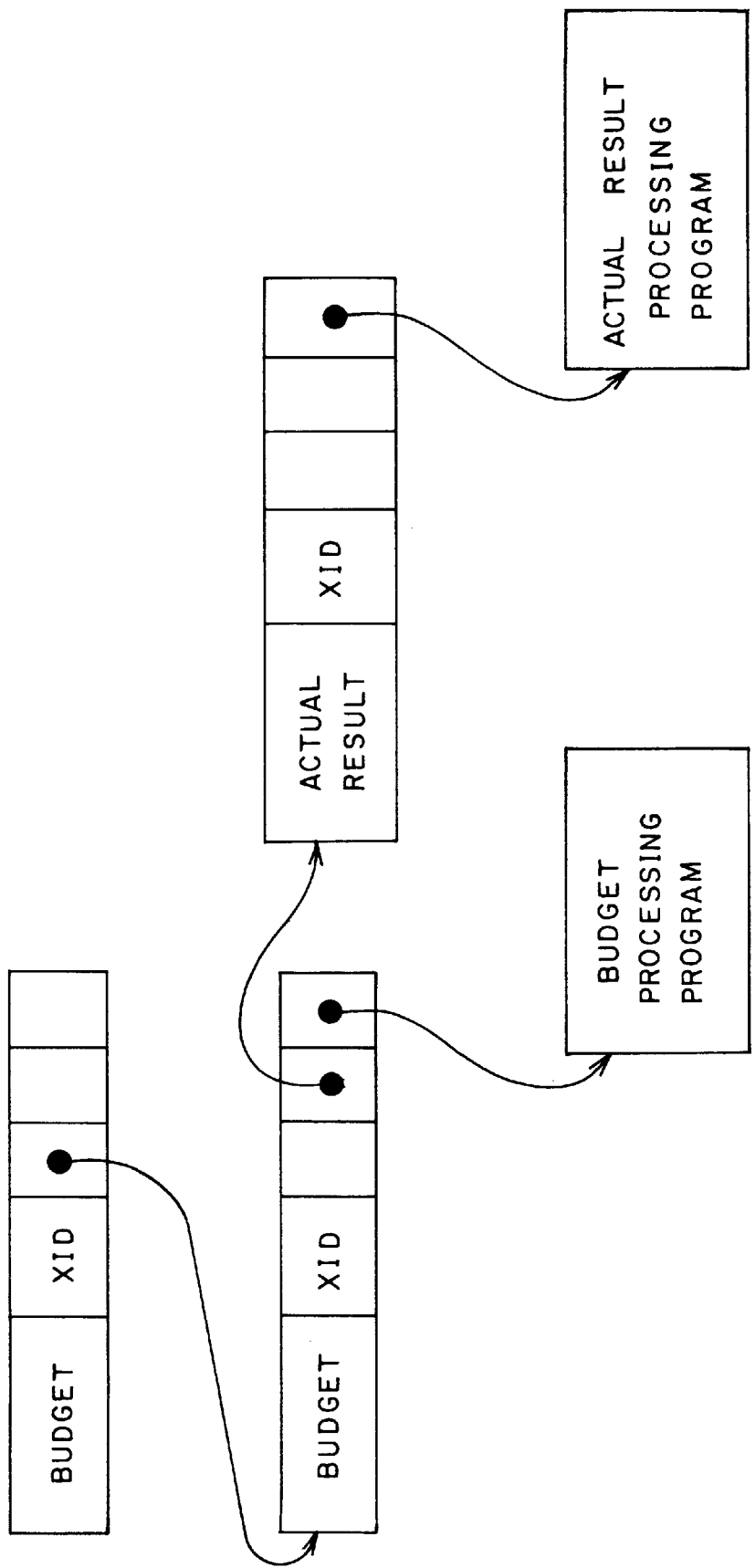
FIG. 29 shows an example of a budget entity management table in the process schedule control system of the present invention.

FIG. 29 shows an example of an entity management table corresponding to the budget template. In a lower budget record pointed to by a higher budget record is placed a pointer that points to a budget processing program Also, in the actual-result record is placed a pointer that points to an actual-result processing program.

Figure 30:
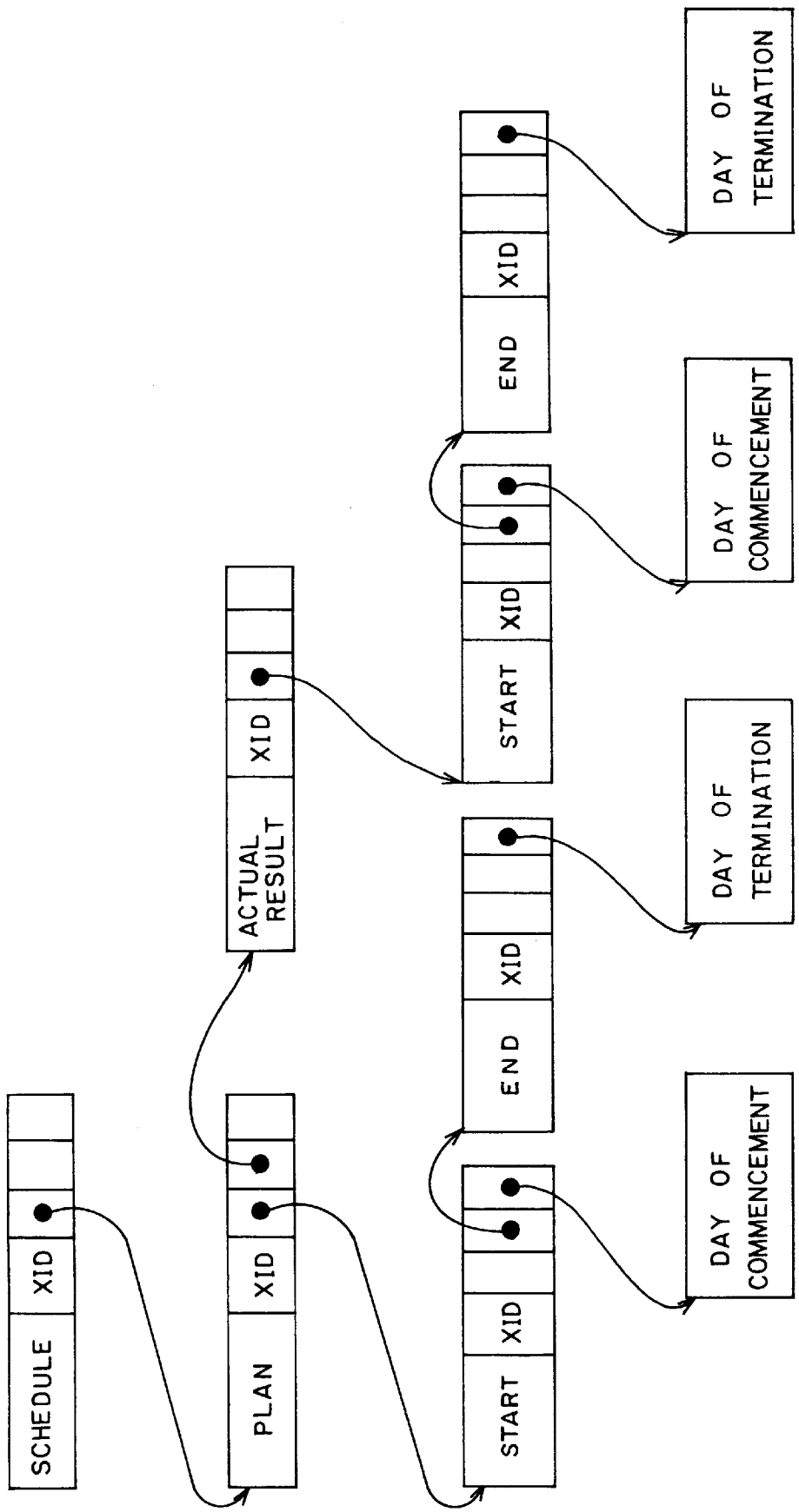
FIG. 30 shows an example of a schedule entity management table in the process schedule control system of the present invention.

FIG. 30 shows an example of an entity management table corresponding to the schedule template. Start and end records that are below a plan record respectively point to entity information items of "day of commencement" and "day of termination" of planned work. Start and end records that are below an actual-result record respectively point to entity information items of "actual day of commencement" and "actual day of termination" of that work.

Thus, the entity pointers of the entity management tables of the present invention can point not only to entity information items such as character strings but also to objects such as management names or processing programs. It is also possible to choose a template itself as an object. What kind of object is to be specified depends on the kind of template.

Figure 31:
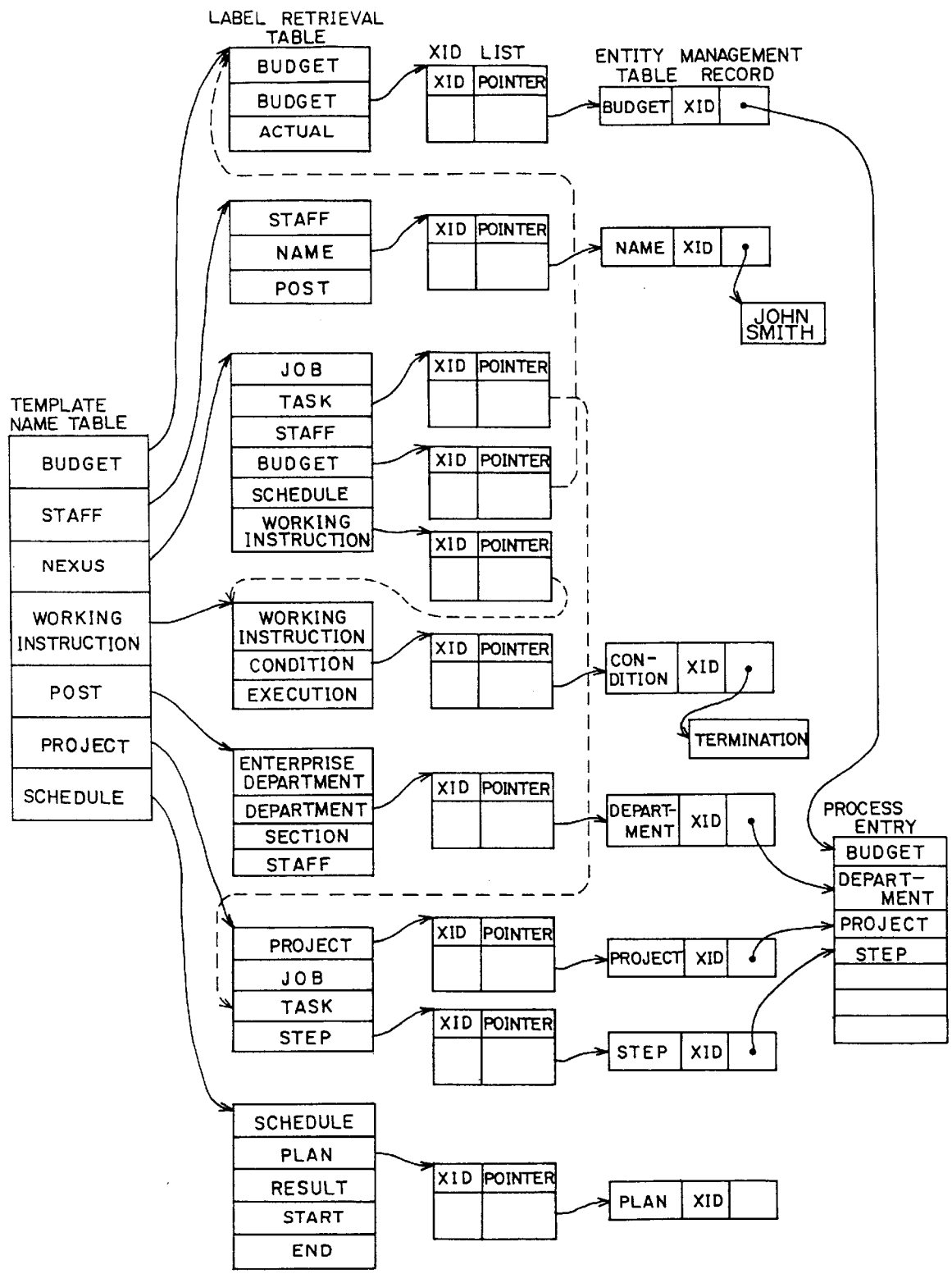
FIG. 31 shows an example of an XID entity management table in the process schedule control system of the present invention.

FIG. 31 shows an example of an XID management table in the process schedule control. In a template name table are stored names of budget, staff, relationship, working instruction, post, project and schedule templates and pointers to label retrieval tables corresponding to the respective templates. In each label retrieval table are stored label names used in the corresponding template and pointers to XID lists corresponding to the respective label names.

Pointers in the XID lists generally point to records in corresponding respective entity management tables. However, records in the nexus entity management table have no entity information items and thus pointers in its XID lists are used to find XIDs of records pointed to by records having corresponding XIDs in the nexus entity management table. The entities corresponding the XIDs thus found are simply retrieved from the label retrieval tables of the other templates having the same labels as indicated by broken lines.

In FIG. 31, there is shown an example in which each of budget, department, project and step records points to a corresponding one of process entries.

Figure 32:
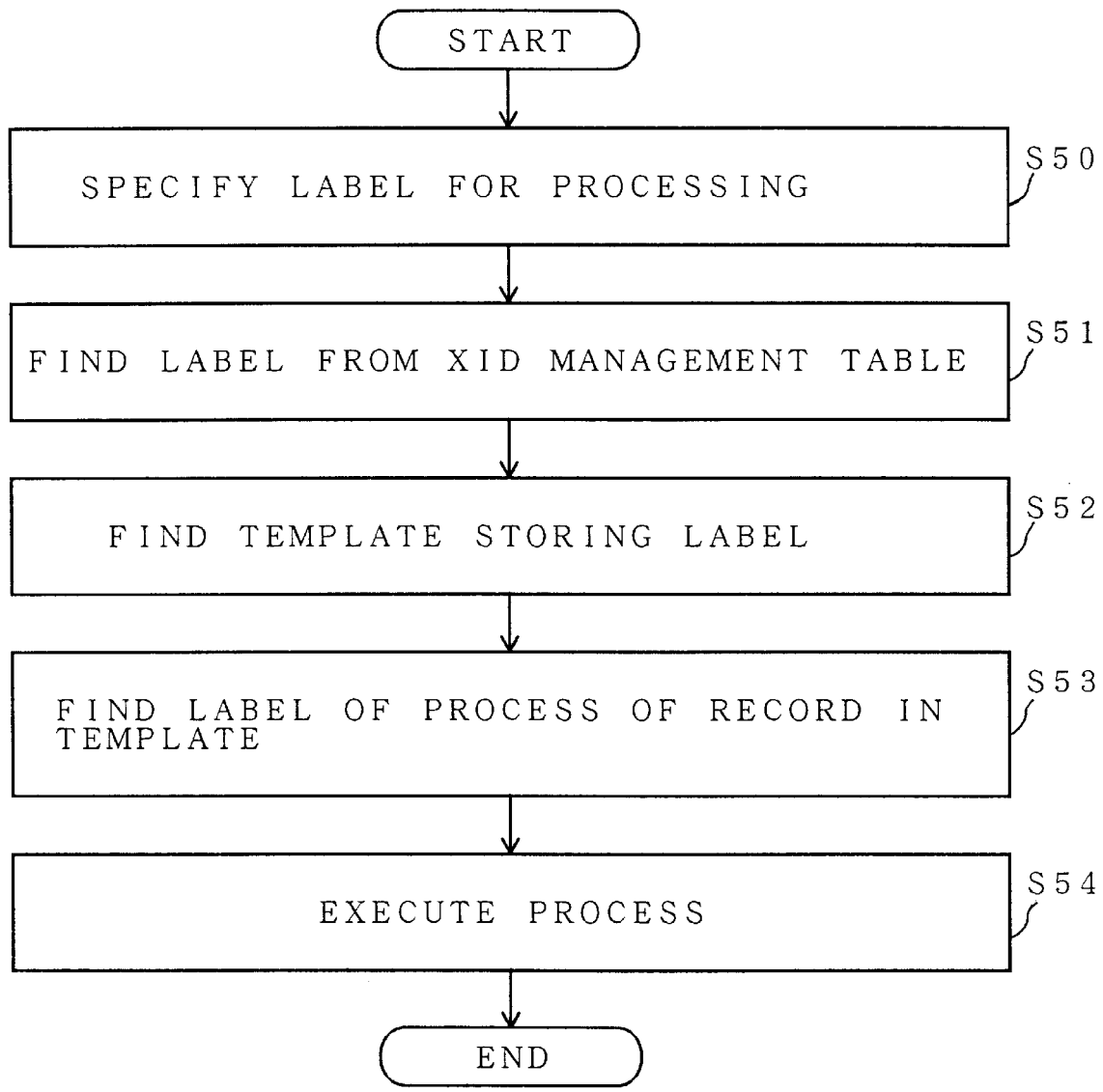
FIG. 32 shows the algorithm of basic processing by the work flow control unit in the present invention.

FIG. 32 is a flowchart for the basic algorithm for executing processes specified by process labels stored at the end of the respective records of the templates as basic processes in the process schedule control system.

In FIG. 32, in the first place, a label to be processed is specified in step S50. In this case, the desired label is specified by the system user or the system itself. For example, a manager as the system user may specify a label to be processed in order to inquire of the system about daily work conditions. For routine work such as working instructions to workers, a label to be processed may be selected by the system after a lapse of a specified period of time that is measured by a timer.

In subsequent step S51, the XID management table of FIG. 31 is searched for the corresponding label. In step S52, a template in which that label thus found is stored is obtained. In step S53, the process label placed at the end of the record in that template is obtained and the process is executed in step S54. As the conditions or parameters of this process, the contents (entity information value) pointed to by an entity pointer which has been obtained beforehand or the contents pointed to by an entity pointer corresponding to the XID obtained during the label retrieval are used.

Within the process in step S54, updating of the contents of entity information or addition or deletion of records in the structure management tables or the entity management tables is also possible. Here, the updating of entities means that, for example, the entity information item of "JOHN SMITH" pointed to by a name entity pointer is rewritten into the entity information of "SUE BROWN". The addition or deletion of records in the structure management table means that when a new section is set up or a department is discontinued, data on that section is added or data on that department is deleted by pointer operations.

This feature is also capable of searching for staff to which no task is linked and allocating the staff to a job in which a task is decided and the staff is undetermined.

Figure 19:
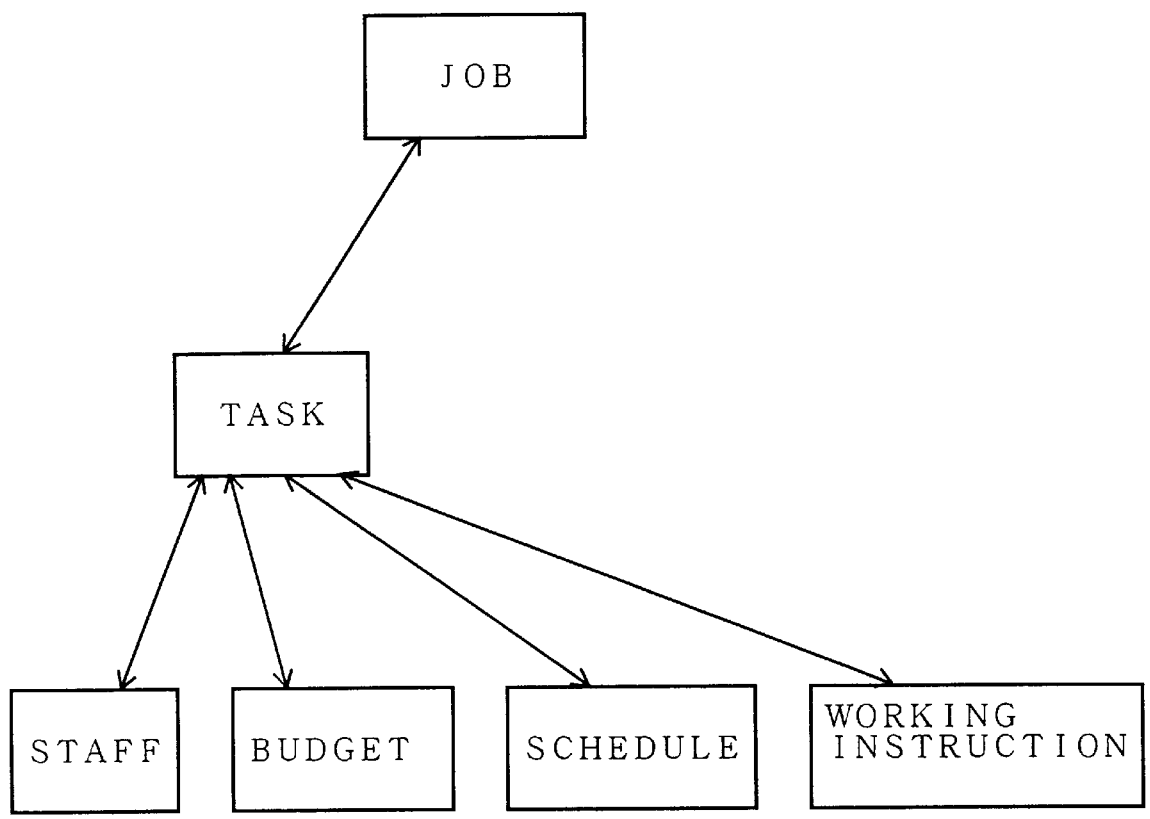
FIG. 19 shows an example of a general form of a nexus template in the process schedule control system of the present invention.
Figure 20:
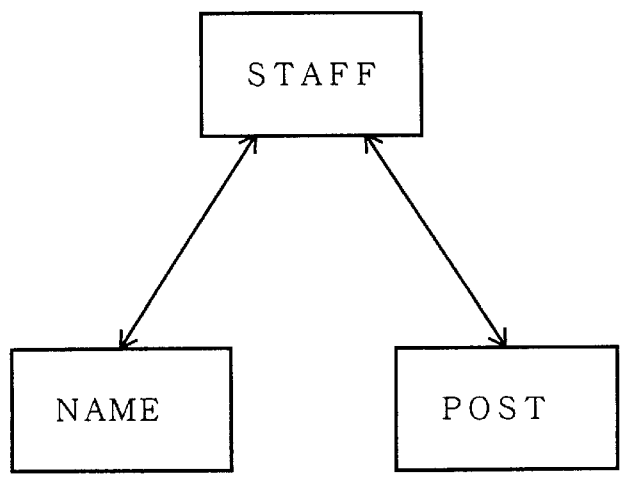
FIG. 20 shows an example of a general form of a staff template in the process schedule control system of the present invention.
Figure 21:
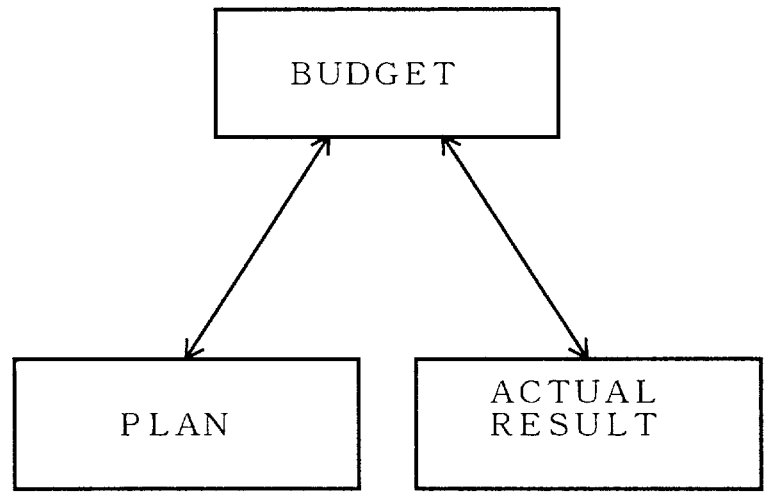
FIG. 21 shows an example of a general form of a budget template in the process schedule control system of the present invention.
Figure 22:
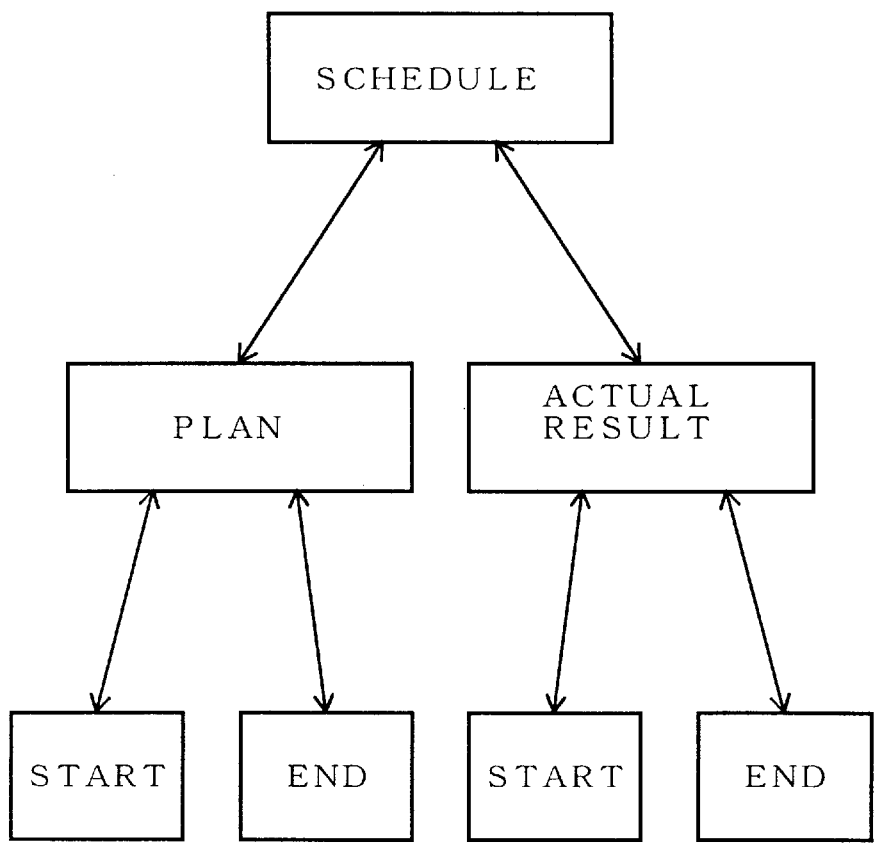
FIG. 22 shows an example of a general form of a schedule template in the process schedule control system of the present invention.

That is, as shown in the nexus template of FIG. 19, the staff record is below the task record. On the entity management table, the staff XID is retrieved by task. If the staff XID is not found, then it is seen that the staff is not allocated any job. In actual processing, the staff is registered on an allocation table at the time the staff is allocated a job. Here, the allocation table refers to a table of jobs allocated to staff, e.g., the entity management table of FIG. 26 for example.

Figure 33:
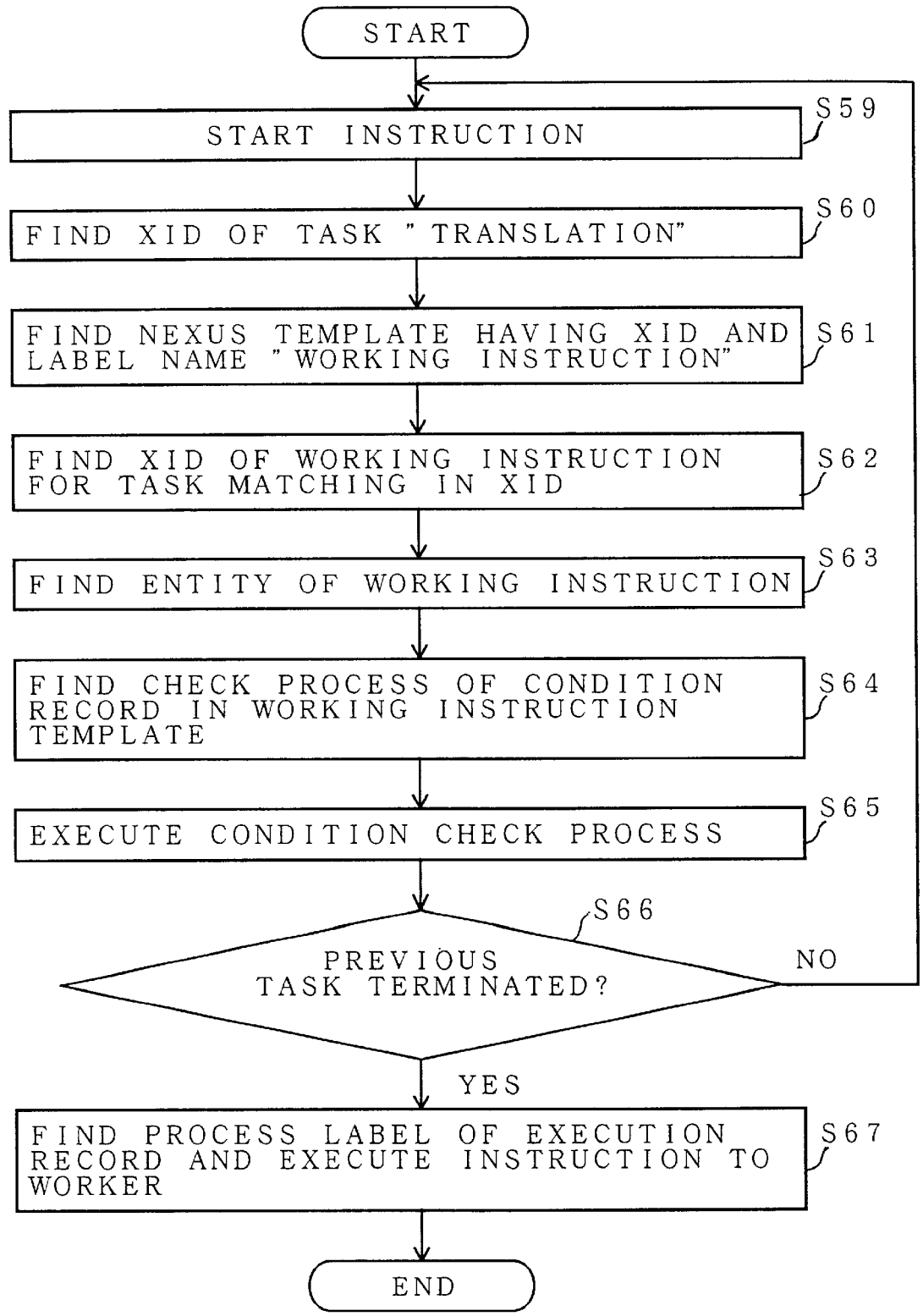
FIG. 33 is a flowchart for the working instruction for workers according to the present invention.

FIG. 33 is a flowchart illustrating the way of giving working instructions to workers, which is a part of processing performed by the work flow control unit 28. The work flow management is implemented by using the basic processing algorithm described in connection with FIG. 32. The work flow management is performed basically by a database engine and its associated processing programs. In the present invention, the work flow processing is implemented by the database engine while programs called via the process labels are updating various data items managed by the above-described information management system.

The flowchart of FIG. 33 will be described taking, as an example, working instructions for allocating a task of "translation" to a staff member named "JOHN SMITH". In the routine work of FIG. 24, tasks are performed in the order of rank beginning from the front, and the processing of FIG. 33 is started at the termination of the work of "writing".

In step S60 subsequent to step S59 for instruction of start, a XID of a task of "translation" is retrieved from the project entity management table. In practice, task records in that table are examined one by one to obtain the XID of the task of "translation". In subsequent step S61, a nexus template having the XID of the task of "translation" in its XID list and a label name of "working instruction" in its label name retrieval table is retrieved from the XID management table.

A nexus template is created by grouping information items that a manager desires to manage or information items to be related to one another in order to understand the work of workers and attaching an arbitrary name. In general, there are multiple nexus templates. Owing to these nexus templates, links are established among the project, staff, schedule, etc., necessary for work.

In step S62 subsequent to step S61, the working instruction XID corresponding to the task matching in XID is retrieved from the nexus entity management table corresponding to that nexus template. In step S63, a working instruction entity information item pointed to from the working instruction XID is obtained using the XID management table.

After the working instruction entity information item has been obtained, a condition check process specified by the label stored at the end of the condition record in the working instruction template in step S64, and that condition check process is carried out in step S65. Although this condition check process will be described in detail with reference to FIG. 34, basically a check is here made as to whether or not a task prior to the task in question of "translation" has bee terminated.

In step S66, a decision is made as to whether or not the prior task has been terminated. If terminated, then the working instruction process, specified by the process label at the end of the execution record that is in the rear of the condition record in rank in FIG. 18B, is carried out in step 67, bringing the processing to an end. If not terminated, the steps following step S59 are repeated. In the working instruction process, mail or instructions are issued to a worker via the interface unit 23, and the contents thereof will contain a summary of entity information items, such as "translation", "JOHN SMITH", etc.

The working instructions about the task "translation" to the staff "JOHN SMITH" will be further explained. As shown in FIG. 24, the translation task is an entity information item pointed to by a record in the project entity management table, and the staff of "JOHN SMITH" is an entity information item pointed to by the name record in the staff entity management table of FIG. 28.

It is the nexus entity management table in FIG. 27 that relates these entity information items with one another. Thus, when work is shifted from the task of writing to the task of translation in FIG. 24, a task XID is used to obtain the staff XID that is below that task in the nexus entity management table to thereby specify the staff "JOHN SMITH", and an working instruction entity information item is further obtained by the working instruction XID that is in the rear of the staff in rank. Thereby, an electronic mail or a working instruction is issued to the staff "JOHN SMITH".

Subsequently, the reason why the process returns to step S59 when the result of the decision in step S66 is NO will be further described. It may be thought that, when the decision in step S66 is that the prior task has not been terminated, it is possible to return the process to step S64 after a lapse of a period of time from the activation of a timer and to reexecute the condition check processing. In the present embodiment, however, the process returns to step S59, not to step S64. This is to simplify the processing system.

That is, the condition check processing in step S65, which is a completion process corresponding to an object-oriented method, is activated, not by a timer, but by only messages in the information management system, thereby permitting the processing system to be simplified.

The flowchart of FIG. 33 is also likewise applicable to the rewriting of work conditions or budget management. For example, alteration of conditions is made when a worker terminates work, more specifically, when the work termination button is pressed or the termination of work is reported to a manager.

The standard report unit 29 and the special report unit 30 output an entity information report or solicited historical data (entity information) in the form of mail or hard copy in the same manner as the instruction processing in step S67 of FIG. 33.

Figure 34:
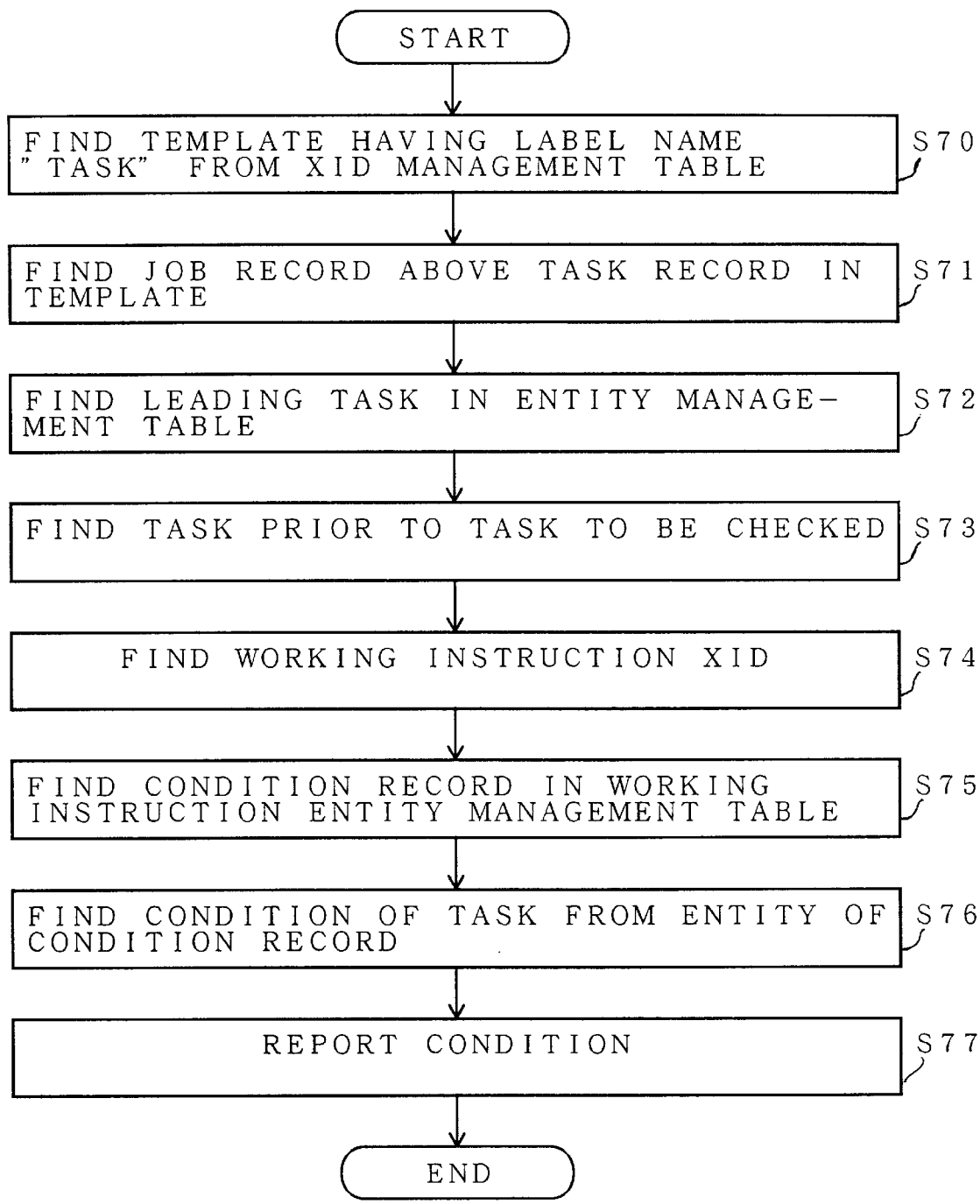
FIG. 34 is a detailed flowchart for the condition check processing according to the present invention.

FIG. 34 is a detailed flowchart for the condition check processing in step S65 of FIG. 33. In the first place, a nexus template having task as a label name is retrieved from the XID management table in step S70. Next, in step S71, a job record that is above the task record is retrieved from the nexus template, and, in subsequent step S72, the most prior task pointed to by the job record in the nexus entity management table of FIG. 27 is retrieved. Next, in step S73, tasks pointed to by backward pointers one after another are sequentially searched for a task prior to a task whose condition is to be checked. In step S74, a working instruction record that is below the prior task record and its XID is found. In subsequent step S75, that working instruction XID thus found is used to retrieve the corresponding working instruction record from the working instruction entity management table of FIG. 26. A condition record pointed to by that record is retrieved. In step S76, the condition of the prior task, i.e., the termination or not, is obtained from entity information of that condition record. In subsequent step S77, the condition is reported, thereby terminating the process.

Figure 35:
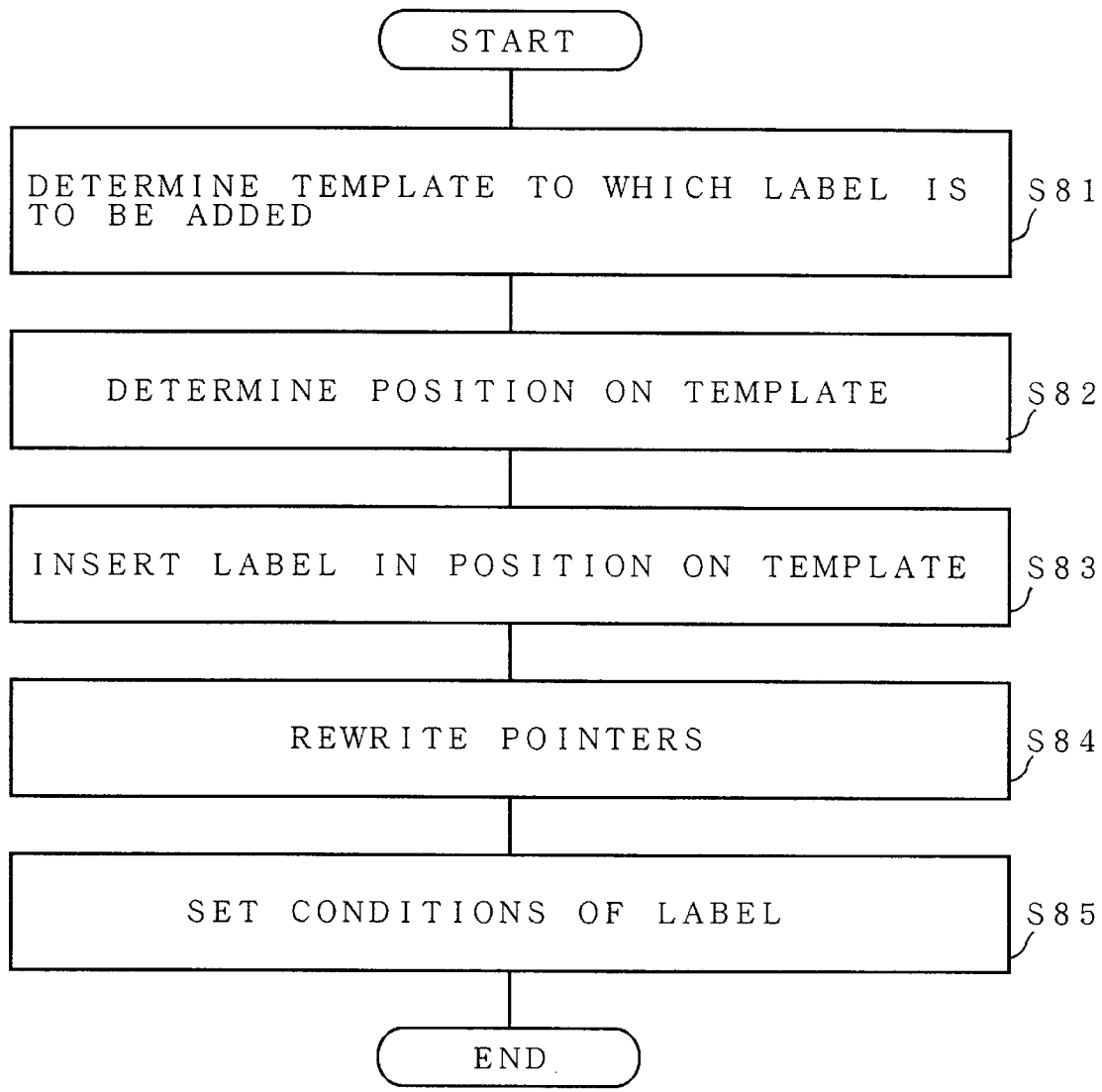
FIG. 35 is a flowchart for the creation of a template by a policy definition unit in the present invention.

FIG. 35 is a flowchart for addition of template records by the policy definition unit 26. This process is performed on an operator-system interactive basis via the terminal 21. In step S81, a template to which a label is to be added is determined first. In subsequent step S82, the position on that template where the label is to be inserted is determined. In step S83, a record of that label is inserted in the position on the template thus determined. In step S84, pointers which are involved in adding a new label are rewritten. In step S85, conditions, such as the number of entity information items, are stored in the condition storage position of the added record, thus terminating the process.

A new template is created by adding labels in sequence in accordance with the same procedure as in FIG. 35.

Figure 36:
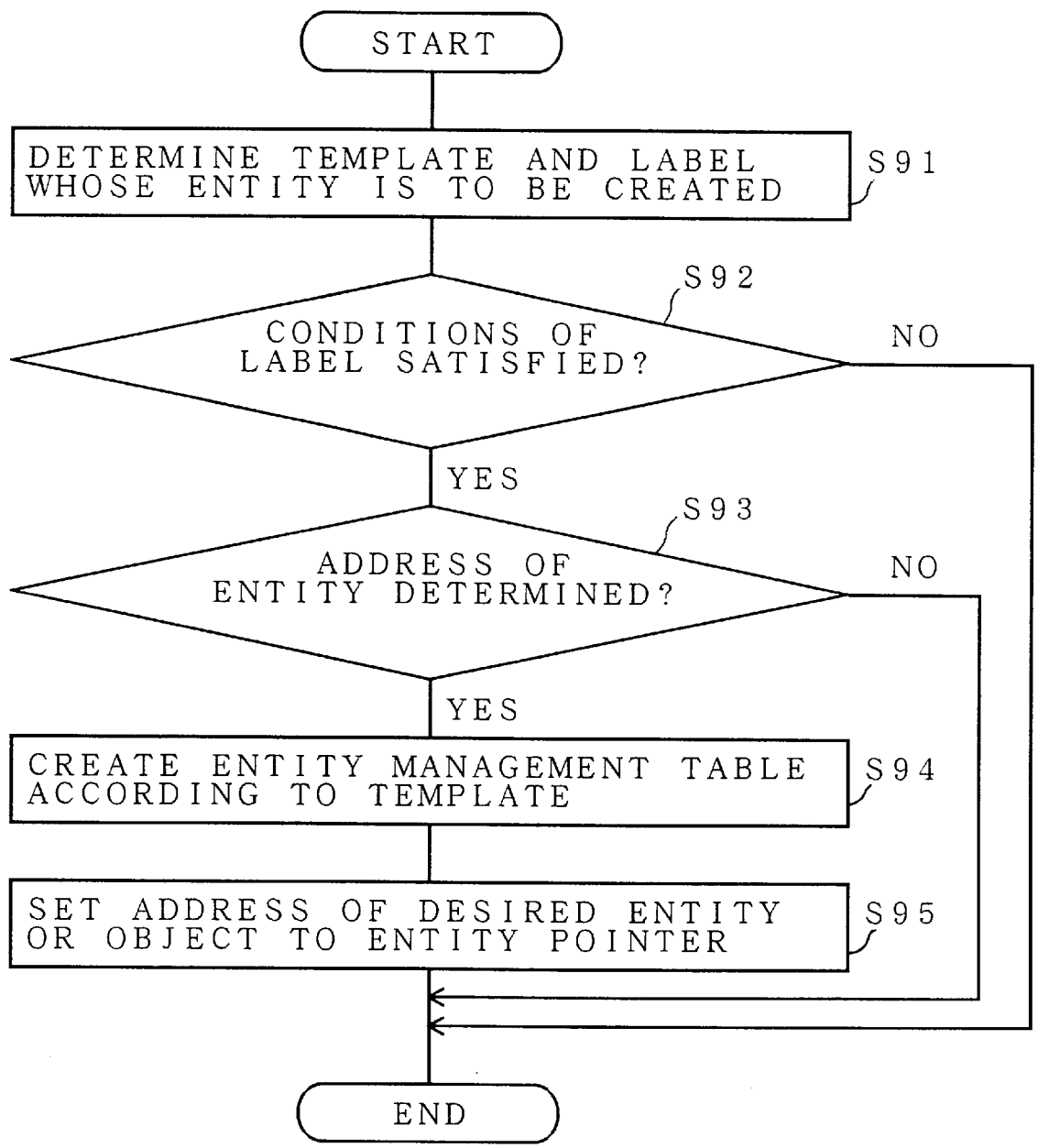
FIG. 36 is a flowchart for the creation of an entity management table by a project definition unit in the present invention.

FIG. 36 is a flowchart for the creation of an entity management table by the project definition unit 27. This processing is also performed on an operator-system interactive basis via the terminal 21. In step S91, a template and a label are determined for an entity management table to be created. In subsequent step S92, a reference is made to a template already created to make a decision as to whether conditions for that label are met. In subsequent step S93, a decision is made as to whether an address of an entity information item or an object has been determined. If the decision in step S92 is that the conditions are not met, then the process is terminated.

If the conditions are met and the address is determined, then a record is created in accordance with the structure defined by the template and an XID and downward and rearward pointers are stored in that record to create an entity management table. In step S95, the address of the entity information or an object is stored as an entity pointer of that record. In creating a nexus entity management table, records related among more than one templates are created. In this case, entity pointers are not necessarily stored in these records.

When the decision in step S93 is that the address is not determined, the processing is interrupted. At the time the address is determined, the creation of the entity management table is resumed.

Figure 37:
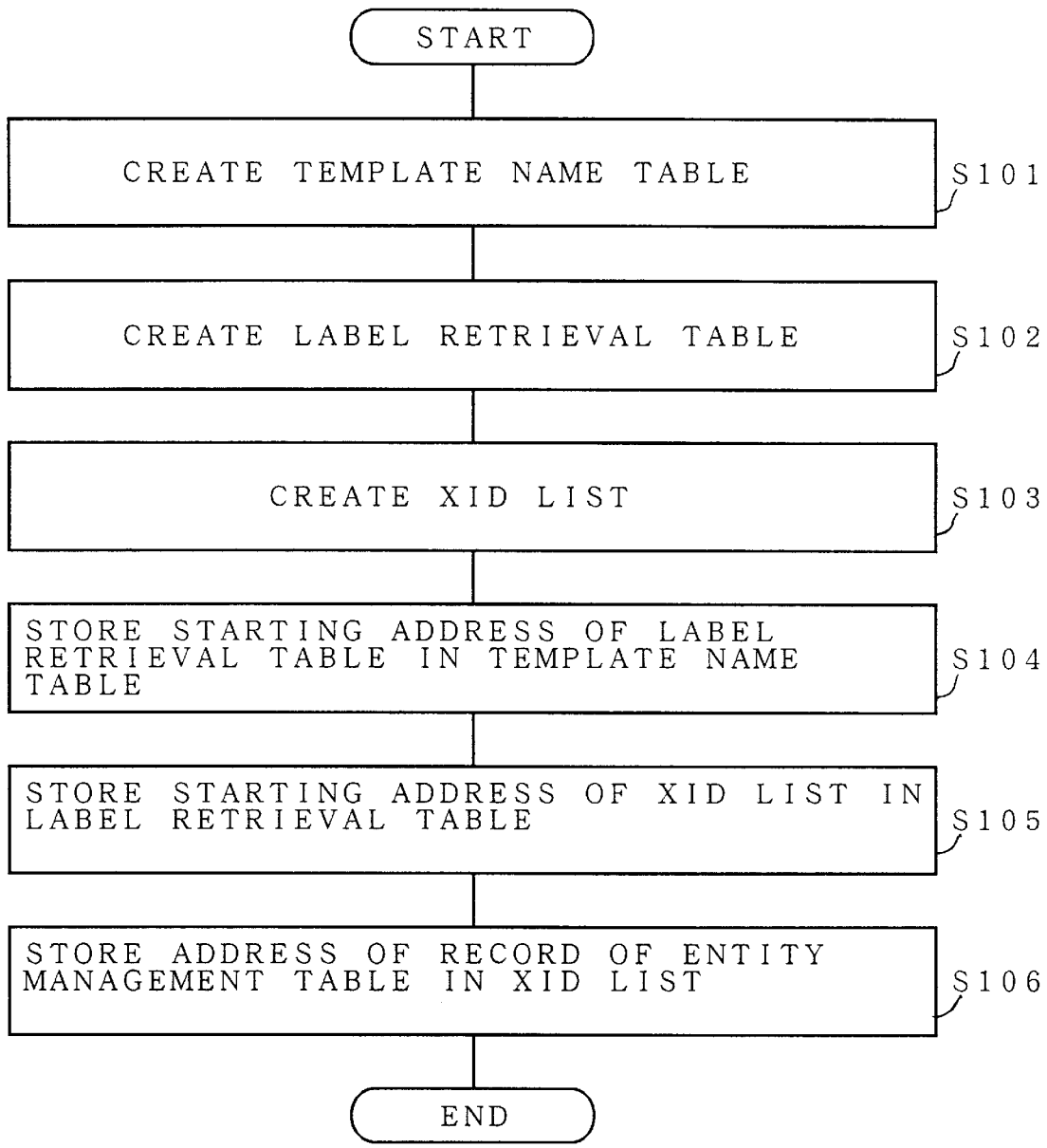
FIG. 37 is a flowchart for the creation of an XID management table by the project definition unit in the present invention.

FIG. 37 is a flowchart for the creation of an XID management table by the project definition unit 27. This processing is performed on the basis of created templates and entity management tables. In step S101, a template name table in which the names of all the templates are stored is created first. In subsequent step S102, label retrieval tables each storing all the labels used in the corresponding respective template are created. In step S103, an XID list storing all the XIDs defined in the entity management table is created for each label.

In step S104, a starting address of each label retrieval table for the corresponding respective template is stored in the template name table. In step S105, a starting address of a XID list corresponding to each label is stored in the label retrieval tables. In step S106, an address of an entity management table record corresponding to each XID value is stored as a pointer in the XID lists, thereby terminating the process.

Alteration or deletion of data in the templates, the entity management tables and the XID management tables is performed in the same procedure as in FIGS. 35, 36 and 37.

As described above in detail, the present invention allows each record in the structure management tables indicating relationships among types of data, i.e., templates, to have upward, downward, forward and rearward pointers, i.e., pointers in four directions and the entity management tables for managing a large quantity of actual information to have only downward and rearward pointers, thereby allowing execution of information management without increasing an amount of data, which is substantially the same as when all the actual information, i.e., entity information items are each allowed to have four upward, downward, forward and rearward pointers.

Moreover, application of this information management system to a process schedule control system permits the process schedule control to be performed comprehensively In the process schedule control, the organizational hierarchical structure and the time-sequential structure of an operating environment can be simultaneously represented by each of entity management tables, which permits accommodation of any complex information.

Furthermore, complex information can be defined simply and consistently, and definition contents can be created and altered easily without depending on professional programmers.

What is claimed is:

1. An information management system, comprising:
    structure management means for storing a structure management table having a record containing a record pointer to a higher record than said record in a predetermined high-low relationship; and
    entity management means for storing an entity management table having records each containing an item pointer to an information item and said record pointer in said structure management table representing a connection relationship among said records in said entity management table,
    wherein information management is performed by using said structure management means and said entity management means in combination.

2. An information management system for allocating unique identifiers to individual information items for information management, said information system comprising:
    structure management means for storing a structure management table having a record containing a pointer to a higher record than said record in a predetermined high-low relationship; and
    entity management means for storing an entity management table having a record containing a pointer to an information item,
    wherein information management is performed by using said structure management means and said entity management means in combination;
    wherein said structure management table in said structure management means comprises records corresponding to types of the individual information items, each of said records storing pointers to high-rank and low-rank records that have the high-low relationship with each said record and a pointer to one of front-rank and rear-rank records that are in the same rank in said high-low relationship as each said record,
    wherein said entity management table in said entity management means comprises records each storing a label corresponding to a respective one of said records in said structure management table, an identifier for one of the individual information items corresponding to said label, pointers to low-rank and rear-rank records corresponding to a structure of said management table, and a pointer to said one of the individual information item corresponding to said identifier, and
    further including identifier management means for storing a pair of said identifier and a pointer, said identifier corresponding to said label of one of said records in said entity management table and said pointer pointing to said one of said records in said entity management table which corresponds to said identifier corresponding to said structure management table, and
    wherein information is managed by using said structure management means and said entity management means through intermediation of said identifier management means.

3. An information management system for allocating unique identifiers to individual information items for information management, said information management system comprising:
    structure management means for storing a structure management table having a record containing a pointer to a higher record than said record in a predetermined high-low relationship; and
    entity management means for storing an entity management table having a record containing a pointer to an information item,
    wherein information management is performed by using said structure management means and said entity management means in combination,
    wherein said structure management table in said structure management means comprises records corresponding to types of the individual information items, each of said records storing pointers to high-rank and low-rank records that have the high-low relationship with each said record and a pointer to one of front-rank and rear-rank records that are in the same rank in said high-low relationship as each said record,
    wherein said entity management table in said entity management means comprises records each storing a label corresponding to a respective one of said records in said structure management table, an identifier for one of the individual information items corresponding to said label, pointers to low-rank and rear-rank records corresponding to a structure of said management table, and a pointer to said one of the individual information item corresponding to said identifier, and further including identifier management means for storing a pair of said identifier and a pointer, said identifier corresponding to said label of one of said records in said entity management table and said pointer pointing to said one of said records in said entity management table which corresponds to said identifier corresponding to said structure management table, wherein information is managed by using said structure management means and said entity management means through intermediation of said identifier management means, and wherein said structure management means stores more than one structure management tables and has a nexus structure management table for managing a relationship among said plurality of structure management tables, and wherein said information management system allows one of said structure management tables to make an access to another structure management table via said nexus structure management table for data retrieval.

4. An information management system for allocating unique identifiers to individual information items for information management, said information management system comprising:

structure management means for storing a structure management table having a record containing a pointer to a higher record than said record in a predetermined high-low relationship; and entity management means for storing an entity management table having a record containing a pointer to an information item, wherein information management is performed by using said structure management means and said entity management means in combination, wherein said structure management table in said structure management means comprises records corresponding to types of the individual information items, each of said records storing pointers to high-rank and low-rank records that have the high-low relationship with each said record and a pointer to one of front-rank and rear-rank records that are in the same rank in said high-low relationship as each said record, wherein said entity management table in said entity management means comprises records each storing a label corresponding to a respective one of said records in said structure management table, an identifier for one of the individual information items corresponding to said label, pointers to low-rank and rear-rank records corresponding to a structure of said management table, and a pointer to said one of the individual information item corresponding to said identifier, and further including identifier management means for storing a pair of said identifier and a pointer, said identifier corresponding to said label of one of said records in said entity management table and said pointer pointing to said one of said records in said entity management table which corresponds to said identifier corresponding to said structure management table, wherein information is managed by using said structure management means and said entity management means through intermediation of said identifier management means, and wherein said entity management means comprises one or more entity management tables including that entity management table in which said pointer to an information item corresponding to said identifier is not stored, and said structure management means comprises one or more structure management tables including that structure management table corresponding in structure to said entity management table in which said pointer to an entity information item corresponding to said identifier is not stored.

5. An information management system according to claim 2, wherein said identifier management means stores an identifier management table which comprises a structure management table name table for storing names of one or more structure management tables, a label retrieval table pointed to by an entry of a structure management table name in said structure management table name table and storing each label of each of records in one of entity management tables that corresponds to said entry, and an identifier list pointed to by an entry of a label in said label retrieval table and storing a pair of said identifier of said individual information item corresponding to each of labels and said pointer to a record in said entity management table which corresponds to said individual information item.

6. A process schedule control system for performing a process schedule control by using said information management system as defined in claim 2, further comprising:

policy definition means for performing a policy definition including a definition of said structure management table required for said process schedule control;

project definition means for performing a project definition including a definition of said entity management table corresponding to one or more structure management tables defined by said policy definition means; and work flow management means for controlling processes using said structure management table and said entity management table defined by said policy definition means and said project definition means, and said identifier management means.

7. A process schedule control system according to claim 6, wherein said work flow management means checks a condition of work in said processes and gives a working instruction according to said condition to a worker by using said structure management table, said entity management table and said identifier management means.

8. A process schedule control system according to claim 7, further comprising:

standard report means for generating a report on a result of said work by using said structure management table, said entity management table and said identifier management means; and special report means for managing a history of said work and generating a report on the history in response to an inquiry.

9. A process schedule control system according to claim 6, wherein said identifier management means stores an identifier management table which comprises a structure management table name table for storing names of one or more structure management tables, a label retrieval table pointed to by an entry of a structure management table name in said structure management table name table and storing each label of each of records in one of entity management tables that corresponds to said entry, and an identifier list pointed to by an entry of a label in said label retrieval table and storing a pair of said identifier of said individual information item corresponding to each of labels and said pointer to a record in said entity management table which corresponds to said individual information item.

10. A process schedule control system according to claim 9, wherein a process label for initiating a program is stored in each of said records of said one or more structure management tables, and said program executes a process corresponding to each said record.

11. An information retrieval method for a first information item related to a second information item whose corresponding identifier is already known, said first and second information items being stored in said information management system as defined in claim 5, said method comprising the steps of:

finding a type of an information item that is before or above a type of said second information in rank and is before or above a type of said first information item in rank in a nexus structure management table which is one of said structure management tables and indicates a structure of a relationship among said individual information items including a relationship between said first and second information items;

retrieving the type of said information found in said label retrieval table pointed to by an entry of said nexus structure management table in said structure management table name table;

finding a record that is above a record storing said identifier corresponding to said second information item from records in said entity management table which are sequentially pointed to by pointers stored in said identifier list pointed to by an entry of a label retrieved in said label retrieval table;

finding an identifier stored in a record which is below in rank said record found and corresponds to the type of said first information;

finding a label of the type of said first information item in a label retrieval table pointed to by an entry of structure management table names stored in said structure management table name table;

finding an identifier that matches said identifier found from said identifier list pointed to by an entry of said label found;

finding said first information item using a pointer to said first information item stored in a record in said entity management table pointed to by a pointer that corresponds to said matched identifier when there is a match; and repeating, when there is no match, the step of finding the label of the type of said first information item in a label retrieval table pointed to by an entry of structure management table names stored in said structure management table name table.

12. An information management system for managing individual information items, comprising:

entity management means for managing records corresponding to said individual information items, one of said records including type information indicating a type of one of said individual information items; and structure management means for storing records corresponding to said type information and for managing a connection relationship among said individual information items using a connection relationship among said records corresponding to said type information, said information management system managing said individual information items by using said entity management means and said structure management means.

13. An information management system for managing individual information items, comprising:

entity management means for managing records corresponding to said individual information items, one of said records including type information indicating a type of one of said individual information items; and structure management means for storing records corresponding to said type information and for managing a connection relationship among said individual information items using a connection relationship among said records corresponding to said type information;

wherein said entity management means stores a record having a pointer to a lower record and a pointer to one of said individual information items, and said structure management means stores a data record having a pointer to a higher data record and corresponding to the type information; and said information management system manages said individual information items by using said entity management means and said structure management means.

14. An information management system according to claim 13, wherein said record stored in said entity management means has an identifier for identifying said individual information items, and further comprising identifier management means for storing a pair of said identifier and a pointer to a record in said entity management means corresponding to said identifier, whereby said individual information items are managed by using said structure management means and said entity management means through intermediation of said identifier management means.

15. An information management system for managing individual information items, comprising:

entity management means for managing records corresponding to said individual information items, one of said records including type information indicating a type of one of said individual information items; and structure management means for storing records corresponding to said type information and for managing a connection relationship among said individual information items using a connection relationship among said records corresponding to said type information;

wherein said entity management means stores a record having a pointer to a lower record and a pointer to one of said individual information items, and said structure management means stores a record having a pointer to another record in the same rank in a high-low relationship as said record and corresponding to the type information; and said information management system manages said individual information items by using said entity management means and said structure management means.

16. A method of managing individual information items comprising the steps of:

generating a record having a record pointer to a lower record, and an item pointer to one of said individual information items;

generating a data item having a higher item pointer to a higher data item than said data item in a predetermined high-low relationship, representing a type of one of said information items and representing a connection relationship among said records using said record pointer to said lower record and said item pointer to said higher data item; and managing said individual information items using said record and said data item.

17. An information management method according to claim 16, further comprising steps of:

assigning an identifier to said one of said individual information items;

attaching said identifier to said record;

managing a pair of said identifier and a pointer to said record to which said identifier is attached for each of types of said individual information items; and managing said individual information items using said identifier.

18. An information management method according to claim 17, further comprising steps of:

finding said higher data item pointed to by said pointer to said higher data item in generated data items;

finding a record corresponding to said higher data item;

finding a lower record pointed to by said pointer to said lower record in generated records;

finding an identifier attached to said record pointed to by said lower record;

finding another record attached with said identifier found; and retrieving one of said individual information items pointed to from a record which is lower than said another record in rank.

19. A computer-readable storage medium, when used by a computer for managing individual information items, used to direct said computer to perform the functions of:

generating a record having a record pointer to a lower record and an item pointer to one of said individual information items;

generating a data item having a higher item pointer to a higher data item than said data item in a predetermined high-low relationship, representing a type of one of said information items and representing a connection relationship among said records using said record pointer to said lower record and said item pointer to said higher data item; and managing said individual information items using said record and said data item.

20. An apparatus, comprising:

an information management system managing data having data types and data items included within each of the data types, and comprising:

a structure management table storing relationships among the data types; and entity management tables linked to corresponding data types, storing relationships between the data types and the data items and storing relationships to related data items.

21. An apparatus, comprising:

an information management system managing data having data types and data items included within each of the data types, and comprising:

a structure management table storing relationships among the types including vertical pointers between data type records of adjacent rank and horizontal pointers between data type records of a same rank;

entity management tables linked to corresponding data types, storing name labels corresponding to the data types, storing pointers to the data items, storing identifiers of the data items and storing pointers to related data items; and identifier lists corresponding to the data types, storing the identifiers and pointers to the data type records of the data types.

* * * * *